US012621885B2

(12) United States Patent
Suo

(10) Patent No.: US 12,621,885 B2
(45) Date of Patent: May 5, 2026

(54) FILE SHARING METHOD AND TERMINAL DEVICE

(71) Applicant: HONOR DEVICE CO., LTD., Shenzhen (CN)

(72) Inventor: Yayun Suo, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 277 days.

(21) Appl. No.: 18/266,946

(22) PCT Filed: Dec. 13, 2022

(86) PCT No.: PCT/CN2022/138817
§ 371 (c)(1),
(2) Date: Jun. 13, 2023

(87) PCT Pub. No.: WO2023/151377
PCT Pub. Date: Aug. 17, 2023

(65) Prior Publication Data
US 2024/0196454 A1 Jun. 13, 2024

(30) Foreign Application Priority Data
Feb. 10, 2022 (CN) .......................... 202210123103.1

(51) Int. Cl.
*H04W 76/14* (2018.01)
*H04W 36/06* (2009.01)
(Continued)

(52) U.S. Cl.
CPC .......... *H04W 76/14* (2018.02); *H04W 36/06* (2013.01); *H04W 36/142* (2023.05); *H04W 36/302* (2023.05); *H04W 84/12* (2013.01)

(58) Field of Classification Search
CPC . H04W 36/06; H04W 36/142; H04W 36/302; H04W 76/14; H04W 84/12
See application file for complete search history.

(56) References Cited

U.S. PATENT DOCUMENTS 9,585,184 B1 * 2/2017 Sheriff .................. H04W 76/15
10,492,173 B2 11/2019 Jeong et al.
(Continued)

FOREIGN PATENT DOCUMENTS

CN 105101330 A 11/2015
CN 106454975 A 2/2017
(Continued)

*Primary Examiner* — Brian P Cox
(74) *Attorney, Agent, or Firm* — WOMBLE BOND DICKINSON (US) LLP

(57) ABSTRACT

Embodiments of this application provide a file sharing method and a terminal device. The method includes: After receiving a file sharing request of a transmitter device, if a receiver device is currently connected to a 2.4 GHz Wi-Fi network and does not support dual band dual concurrent DBDC, the receiver device establishes a peer-to-peer P2P connection in a target frequency band with the transmitter device, where the target frequency band includes frequency bands of 5 GHz and above; and the receiver device receives, by using the P2P connection, a file sent by the transmitter device. In this way, the transmitter device establishes the P2P connection in a higher wireless frequency band with the receiver device, to prevent another wireless signal in a frequency band of less than 5 GHz from causing interference to the P2P connection between the transmitter device and the receiver device.

19 Claims, 14 Drawing Sheets

(51) Int. Cl.

| | |
|---|---|
| *H04W 36/14* | (2009.01) |
| *H04W 36/30* | (2009.01) |
| *H04W 84/12* | (2009.01) |

(56) References Cited

U.S. PATENT DOCUMENTS

| | | | |
|---|---|---|---|
| 11,197,335 B2 | 12/2021 | Huang et al. | |
| 2014/0359482 A1 | 12/2014 | Sinn et al. | |
| 2019/0082071 A1 | 3/2019 | Ueno et al. | |
| 2019/0268749 A1 | 8/2019 | Jiang et al. | |
| 2019/0364566 A1 | 11/2019 | Husted et al. | |
| 2020/0381805 A1* | 12/2020 | Shiohara | H04W 84/12 |
| 2021/0235255 A1* | 7/2021 | Ansari | H04W 76/14 |

FOREIGN PATENT DOCUMENTS

| | | | |
|---|---|---|---|
| CN | 108990027 A | 12/2018 | |
| CN | 109673001 A | 4/2019 | |
| CN | 109743712 A | 5/2019 | |
| CN | 109769275 A | 5/2019 | |
| CN | 110730448 A | 1/2020 | |
| CN | 110913447 A | 3/2020 | |
| CN | 111372325 A | 7/2020 | |
| CN | 111866824 A | 10/2020 | |
| CN | 113965787 A | 1/2022 | |
| CN | 114157659 A | 3/2022 | |
| EP | 3151620 A1 | 4/2017 | |

* cited by examiner

100

200

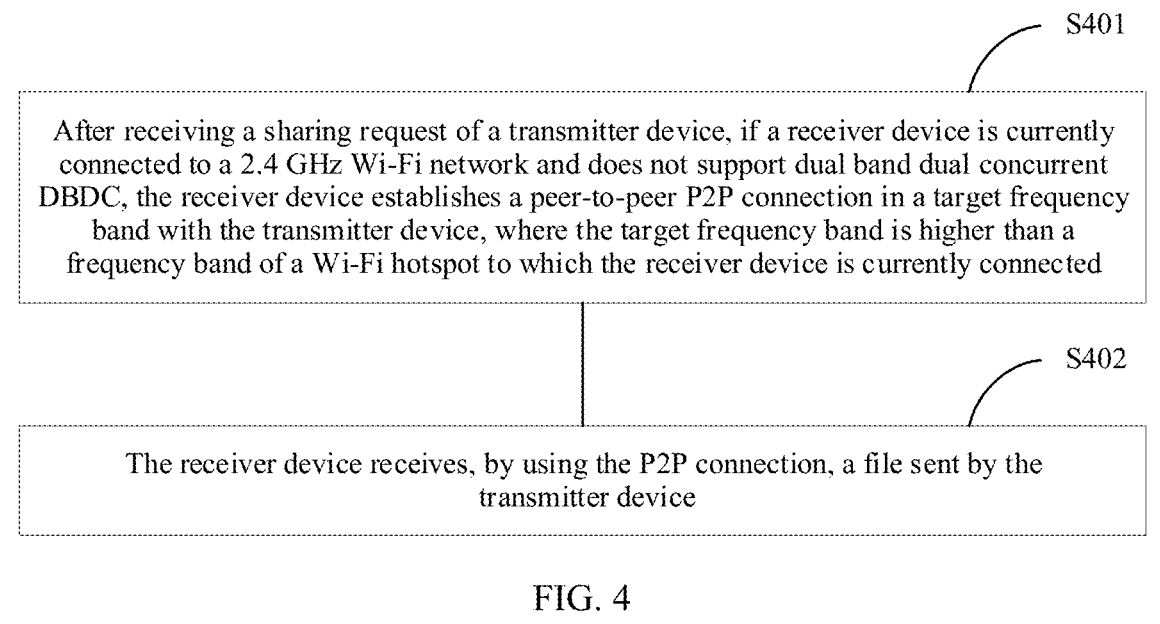

S401

After receiving a sharing request of a transmitter device, if a receiver device is currently connected to a 2.4 GHz Wi-Fi network and does not support dual band dual concurrent DBDC, the receiver device establishes a peer-to-peer P2P connection in a target frequency band with the transmitter device, where the target frequency band is higher than a frequency band of a Wi-Fi hotspot to which the receiver device is currently connected

S402

The receiver device receives, by using the P2P connection, a file sent by the transmitter device

FIG. 4

FILE SHARING METHOD AND TERMINAL DEVICE

CROSS-REFERENCE TO RELATED APPLICATIONS

This application is a National Stage of International Application No. PCT/CN2022/138817, filed on Dec. 13, 2022, which claims priority to Chinese Patent Application No. 202210123103.1, filed on Feb. 10, 2022, both of which are hereby incorporated by reference in their entireties.

TECHNICAL FIELD

Embodiments of this application relate to the field of terminal technologies, and in particular, to a file sharing method and a terminal device.

BACKGROUND

Data may be transmitted between terminal devices based on wireless fidelity (wireless fidelity, Wi-Fi) peer-to-peer (peer-to-peer, P2P) connections. This function is usually used for scenarios in which a user shares photos, files, and the like between different terminal devices. For example, when the user needs to share photos in a mobile phone to a tablet computer, the mobile phone and the tablet computer may establish a Wi-Fi P2P connection with each other in response to an operation of the user, so that the photos in the mobile phone can be sent to the tablet computer by using the Wi-Fi P2P connection.

Currently, a Wi-Fi technology is mainly implemented in high frequency bands such as 2.4 GHz and 5 GHz frequency bands. When any terminal device is connected to a Wi-Fi hotspot in the 2.4 GHz frequency band and does not support dual band dual concurrent (dual band dual concurrent, DBDC), the Wi-Fi P2P connection between the two terminal devices is negotiated to be established in the 2.4 GHz frequency band. Compared with a high frequency band such as the 5 GHz frequency band, a transmission rate of the 2.4 GHz frequency band is lower, and is also susceptible to interference from Bluetooth or other Wi-Fi signals in the same frequency band. Therefore, when two terminal devices share files based on a Wi-Fi P2P connection in the 2.4 GHz frequency band, a file transmission speed is usually quite low, resulting in a long file transmission time. For example, on the Wi-Fi P2P connection in the 2.4 GHz frequency band, it takes 3 minutes to transmit a 60 MB video file. This greatly wastes user time and reduces use experience of the user.

SUMMARY

Embodiments of this application provide a file sharing method and a terminal device, to improve a speed of file transmission between terminal devices.

According to a first aspect, embodiments of this application provide a file sharing method, applied to a receiver device. The method includes: receiving a first broadcast message sent by a transmitter device, where the first broadcast message includes a file sharing request; sending a second broadcast message to the transmitter device in response to the first broadcast message, where the second broadcast message includes receiver device information; receiving a P2P connection request of the transmitter device, where the P2P connection request is generated by the transmitter device based on the receiver device information;

if the receiver device is currently connected to a 2.4 GHz Wi-Fi network and does not support dual band dual concurrent DBDC, starting a network preferential selection procedure in response to the P2P connection request, where the network preferential selection procedure is used for the receiver device to switch from the 2.4 GHz Wi-Fi network to a Wi-Fi network in a target frequency band, where the target frequency band includes frequency bands of 5 GHz and above; establishing a Wi-Fi P2P connection in the target frequency band with the transmitter device; and receiving a file sent by the transmitter device by using the Wi-Fi P2P connection.

According to the method provided in this embodiment of this application, the transmitter device establishes the Wi-Fi P2P connection in a frequency band of 5 GHz or above with the receiver device, to prevent another wireless signal in a frequency band of less than 5 GHz from causing interference to the Wi-Fi P2P connection between the transmitter device and the receiver device, so as to help improve a speed of file transmission between the transmitter device and the receiver device, improve stability of the Wi-Fi P2P connection between the transmitter device and the receiver device, and shorten a file transmission time, thereby improving use experience of sharing, by a user, a file between two terminal devices.

In an implementation, the network preferential selection procedure includes: determining whether the receiver device is currently connected to a Wi-Fi hotspot in the target frequency band; if the receiver device is not currently connected to the Wi-Fi hotspot in the target frequency band, selecting a target hotspot from surrounding Wi-Fi hotspots in the target frequency band based on a signal strength and/or a protocol standard of the Wi-Fi hotspot; if the target hotspot is selected, determining whether a condition for connecting to the target hotspot is met; and if the condition for connecting to the target hotspot is met, connecting to the target hotspot. In this way, after receiving the file sharing request of the transmitter device, if a target hotspot meeting the connection condition exists, the receiver device is connected to the target hotspot, so that the receiver device can establish the Wi-Fi P2P connection in the target frequency band with the transmitter device, to improve a file transmission speed.

In an implementation, the selecting a target hotspot from surrounding Wi-Fi hotspots in the target frequency band based on a signal strength and/or a protocol standard of the Wi-Fi hotspot includes: selecting, from the Wi-Fi hotspots in the target frequency band, a Wi-Fi hotspot that belongs to a same access point device as a Wi-Fi hotspot to which the receiver device is currently connected and that has a received signal strength indicator RSSI value greater than a first preset threshold as the target hotspot; and/or selecting, from the Wi-Fi hotspots in the target frequency band, a Wi-Fi hotspot that has a largest quantity of signal bars as the target hotspot; and/or selecting, from the Wi-Fi hotspots in the target frequency band, a Wi-Fi hotspot that has a highest protocol standard as the target hotspot. In this way, the receiver device may select, based on the signal strength and/or the network standard, a high-quality Wi-Fi hotspot as the target hotspot.

In an implementation, the determining whether a condition for connecting to the target hotspot is met includes: determining, based on a score and/or a signal strength of the target hotspot, whether the condition for connecting to the target hotspot is met, where the score of the target hotspot is determined based on at least one or more of the following information: a quantity of times of success of historical connections between the receiver device and the target hotspot, a historical transmission rate, a historical signal strength, and a quantity of times of historical freeze.

In an implementation, meeting the condition for connecting to the target hotspot includes any one of the following: the score of the target hotspot is greater than or equal to a second preset threshold, and an RSSI value of the target hotspot is greater than or equal to a third preset threshold; the score of the target hotspot is greater than a sum of a score of a Wi-Fi hotspot to which the receiver device is currently connected and a preset compensation value, and the RSSI value of the target hotspot is greater than or equal to a fourth preset threshold; and the target hotspot and the Wi-Fi hotspot to which the receiver device is currently connected belong to a same access point device, and specific bits in a media access control address MAC address are the same, and the RSSI value of the target hotspot is greater than or equal to a fifth preset threshold. In this way, the receiver device may determine, based on the RSSI and the score of the target hotspot, whether the condition for connecting to the target hotspot is met, to ensure that the connected target hotspot can improve a subsequent file transmission speed.

In an implementation, the method further includes: ending the network preferential selection procedure if the receiver device is currently connected to the Wi-Fi hotspot in the target frequency band.

In an implementation, the method further includes: if the target hotspot is not selected, or if the condition for connecting to the target hotspot is not met, starting a network multiplex procedure.

In an implementation, the network multiplex procedure includes: sending a first indication message to the transmitter device, where the first indication message is used to indicate the transmitter device to create a personal hotspot in the target frequency band; receiving connection information of the personal hotspot from the transmitter device; and connecting to the personal hotspot based on the connection information. In this way, when the receiver device does not meet the condition for connecting to the target hotspot, the transmitter device may create the personal hotspot in the target frequency band, so that the receiver device establishes the P2P connection on the personal hotspot created by the transmitter device.

In an implementation, the network multiplex procedure includes: sending a remote network configuration request to the transmitter device, where the remote network configuration request is used to indicate the transmitter device to configure a P2P agent server network in the target frequency band; receiving a configuration result of the P2P agent server network from the transmitter device; and configuring a local P2P agent client network based on the configuration result, to switch from the 2.4 GHz Wi-Fi network to the P2P agent server network. In this way, when the receiver device does not meet the condition for connecting to the target hotspot, the transmitter device may create the P2P agent server network in the target frequency band, so that the receiver device is connected to the P2P agent server network created by the transmitter device.

In an implementation, the first broadcast message and the second broadcast message are Bluetooth low energy BLE broadcast messages, and the P2P connection request is sent by the transmitter device by using a BLE connection; and before the receiving, by the receiver device, a P2P connection request from the transmitter device, the method further includes: establishing the BLE connection with the transmitter device.

In an implementation, before the establishing a Wi-Fi P2P connection in the target frequency band with the transmitter device, the method further includes: disconnecting the BLE connection from the transmitter device.

According to a second aspect, an embodiment of this application provides a file sharing method, applied to a transmitter device. The method includes: sending a first broadcast message to a receiver device, where the first broadcast message includes a file sharing request; receiving a second broadcast message from the receiver device, where the second broadcast message is sent by the receiver device in response to the first broadcast message, and the second broadcast message includes receiver device information; sending a P2P connection request to the receiver device based on the receiver device information, where if the receiver device is currently connected to a 2.4 GHz Wi-Fi network and does not support DBDC, the receiver device starts a network preferential selection procedure in response to the P2P connection request, where the network preferential selection procedure is used for the receiver device to switch from the 2.4 GHz Wi-Fi network to a Wi-Fi network in a target frequency band, where the target frequency band includes frequency bands of 5 GHz and above; establishing a Wi-Fi P2P connection in the target frequency band with the receiver device; and sending a file to the receiver device by using the Wi-Fi P2P connection.

According to the method provided in this embodiment of this application, the transmitter device establishes the Wi-Fi P2P connection in a frequency band of 5 GHz or above with the receiver device, to prevent another wireless signal in a frequency band of less than 5 GHz from causing interference to the Wi-Fi P2P connection between the transmitter device and the receiver device, so as to help improve a speed of file transmission between the transmitter device and the receiver device, improve stability of the Wi-Fi P2P connection between the transmitter device and the receiver device, and shorten a file transmission time, thereby improving use experience of sharing, by a user, a file between two terminal devices.

In an implementation, before the sending a first broadcast message to a receiver device, where the first broadcast message includes a file sharing request, the method further includes: if the transmitter device is currently connected to a 2.4 GHz Wi-Fi network and does not support DBDC, starting the network preferential selection procedure, where the network preferential selection procedure is used for the transmitter device to switch from the 2.4 GHz Wi-Fi network to a Wi-Fi network in the target frequency band, where the target frequency band includes frequency bands of 5 GHz and above. In this way, when the transmitter device is currently connected to the 2.4 GHz Wi-Fi network and does not support DBDC, the transmitter device may also establish the Wi-Fi P2P connection in a frequency band of 5 GHz or above with the receiver device.

In an implementation, the network preferential selection procedure includes: determining whether the transmitter device is currently connected to a Wi-Fi hotspot in the target frequency band; if the transmitter device is not currently connected to the Wi-Fi hotspot in the target frequency band, selecting a target hotspot from surrounding Wi-Fi hotspots in the target frequency band based on a signal strength and/or a protocol standard of the Wi-Fi hotspot; if the target hotspot is selected, determining whether a condition for connecting to the target hotspot is met; and if the condition for connecting to the target hotspot is met, connecting to the target hotspot. In this way, if the transmitter has a target hotspot meeting the connection condition, the transmitter device is connected to the target hotspot, so that the transmitter device can establish the Wi-Fi P2P connection in the target frequency band with the receiver device, to improve a file transmission speed.

In an implementation, the selecting a target hotspot from surrounding Wi-Fi hotspots in the target frequency band based on a signal strength and/or a protocol standard of the Wi-Fi hotspot includes: selecting, from the Wi-Fi hotspots in the target frequency band, a Wi-Fi hotspot that belongs to a same access point device as a Wi-Fi hotspot to which the transmitter device is currently connected and that has an RSSI value greater than a first threshold as the target hotspot; and/or selecting, from the Wi-Fi hotspots in the target frequency band, a Wi-Fi hotspot that has a largest quantity of signal bars as the target hotspot; and/or selecting, from the Wi-Fi hotspots in the target frequency band, a Wi-Fi hotspot that has a highest protocol standard as the target hotspot. In this way, the transmitter device may select, based on the signal strength and/or the network standard, a high-quality Wi-Fi hotspot as the target hotspot.

In an implementation, the determining whether a condition for connecting to the target hotspot is met includes: determining, based on a score and/or a signal strength of the target hotspot, whether the condition for connecting to the target hotspot is met, where the score of the target hotspot is determined based on at least one or more of the following information: a quantity of times of success of historical connections between the transmitter device and the target hotspot, a historical transmission rate, a historical signal strength, and a quantity of times of historical freeze.

In an implementation, meeting the condition for connecting to the target hotspot includes any one of the following: the score of the target hotspot is greater than or equal to a second preset threshold, and an RSSI value of the target hotspot is greater than or equal to a third preset threshold; the score of the target hotspot is greater than a sum of a score of a Wi-Fi hotspot to which the transmitter device is currently connected and a preset compensation value, and the RSSI value of the target hotspot is greater than or equal to a fourth preset threshold; and the target hotspot and the Wi-Fi hotspot to which the transmitter device is currently connected belong to a same access point device, and specific bits in a MAC address are the same, and the RSSI value of the target hotspot is greater than or equal to a fifth preset threshold. In this way, the transmitter device may determine, based on the RSSI and the score of the target hotspot, whether the condition for connecting to the target hotspot is met, to ensure that the connected target hotspot can improve a subsequent file transmission speed.

In an implementation, the method further includes: ending the network preferential selection procedure if the transmitter device is currently connected to the Wi-Fi hotspot in the target frequency band.

In an implementation, the method further includes: receiving a first indication message from the receiver device; creating a personal hotspot in the target frequency band in response to the first indication information; and sending connection information of the personal hotspot to the receiver device, so that the receiver device is connected to the personal hotspot based on the connection information. In this way, when the receiver device does not meet the condition for connecting to the target hotspot, the transmitter device may create the personal hotspot in the target frequency band, so that the receiver device establishes the P2P connection on the personal hotspot created by the transmitter device.

In an implementation, the method further includes: receiving a remote network configuration request from the receiver device; configuring a P2P agent server network in the target frequency band in response to the remote network configuration request; and sending a configuration result of the P2P agent server network to the receiver device, so that the receiver device configures a local P2P agent client network based on the configuration result, to switch from the 2.4 GHz Wi-Fi network to the P2P agent server network. In this way, when the receiver device does not meet the condition for connecting to the target hotspot, the transmitter device may create the P2P agent server network in the target frequency band, so that the receiver device is connected to the P2P agent server network created by the transmitter device.

In an implementation, the first broadcast message and the second broadcast message are Bluetooth low energy BLE broadcast messages, and the sending a P2P connection request to the receiver device includes: establishing a BLE connection with the receiver device; and sending the P2P connection request to the receiver device by using the BLE connection.

In an implementation, before the establishing a Wi-Fi P2P connection in the target frequency band with the receiver device, the method further includes: disconnecting the BLE connection from the receiver device.

According to a third aspect, an embodiment of this application further provides a terminal device, including a processor and a memory. The memory stores program instructions. When the program instructions are executed by the processor, the terminal device is enabled to perform the method performed by the receiver device and/or the transmitter device in the foregoing aspects and the implementations of the foregoing aspects.

According to a fourth aspect, an embodiment of this application further provides a chip system. The chip system includes a processor and a memory. The memory stores program instructions. When the program instructions are executed by the processor, the chip system is enabled to perform the methods in the foregoing aspects and the implementations of the foregoing aspects, for example, generate or process information in the methods.

According to a fifth aspect, an embodiment of this application further provides a computer-readable storage medium. The computer-readable storage medium stores program instructions. When the program instructions are run on a computer, the computer is enabled to perform the methods in the foregoing aspects and the implementations of the foregoing aspects.

According to a sixth aspect, an embodiment of this application further provides a computer program product. When the computer program product is run on a computer, the computer is enabled to perform the methods in the foregoing aspects and the implementations of the foregoing aspects.

BRIEF DESCRIPTION OF DRAWINGS

FIG. 4 is a flowchart of a file sharing method according to an embodiment of this application;

DESCRIPTION OF EMBODIMENTS

Figure 1:
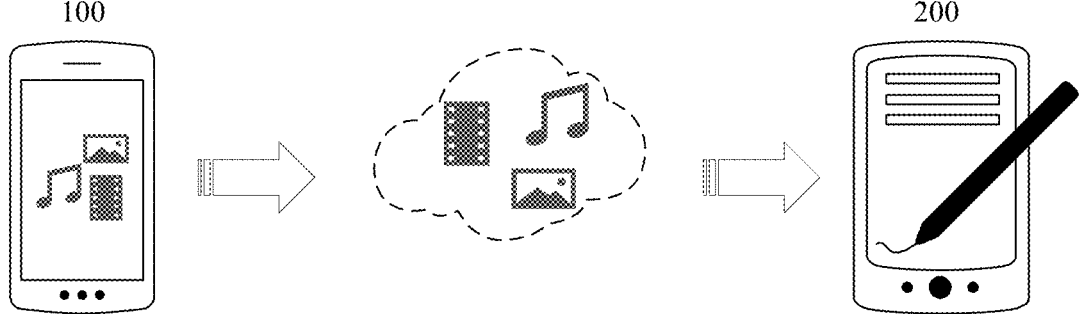
FIG. 1 is a schematic diagram of a scenario to which an embodiment of this application is applicable.

The following clearly describes the technical solutions in embodiments of this application with reference to the accompanying drawings in the embodiments of this application. Apparently, the described embodiments are merely some rather than all of embodiments of this application. All other embodiments obtained by a person of ordinary skill in the art based on the embodiments of this application without creative efforts shall fall within the protection scope of this application.

In this application, the character "/" generally indicates an "or" relationship between the associated objects. For example, A/B may be understood as A or B.

The terms "first" and "second" are used merely for the purpose of description, and shall not be construed as indicating or implying relative importance or implying a quantity of indicated technical features. Therefore, a feature defined with "first" or "second" may explicitly or implicitly include one or more of the features. In the descriptions of this embodiment, "a plurality of" means two or more than two unless otherwise specified.

In addition, the terms "include" and "have" mentioned in the description of this application and any other variant thereof are intended to cover non-exclusive inclusion. For example, a process, method, system, product, or device that includes a series of steps or modules is not limited to the listed steps or modules, but further optionally includes a step or module that is not listed, or further optionally includes another step or module that is intrinsic to the process, method, product, or device.

In addition, in the embodiments of this application, words such as "exemplary" or "example" are used to indicate instances, illustrations, or descriptions. Any embodiment or design scheme described as "exemplary" or "example" in this application should not be construed as being more preferred or advantageous than other embodiments or design schemes. Exactly, use of the terms, such as "exemplary" or "for example", is intended to present a concept in a specific manner.

To facilitate understanding of the technical solutions of this application, before a file transmission method in embodiments of this application is described in detail, the conventional technology is first described.

Data may be transmitted between terminal devices based on a Wi-Fi P2P connection. This function is usually used for scenarios in which a user shares photos, files, and the like between different terminal devices. For example, when the user needs to share photos in a mobile phone to a tablet computer, the mobile phone and the tablet computer may establish a Wi-Fi P2P connection with each other in response to an operation of the user, so that the photos in the mobile phone can be sent to the tablet computer by using the Wi-Fi P2P connection.

Currently, a Wi-Fi technology is mainly implemented in high frequency bands such as 2.4 GHz and 5 GHz frequency bands. When any terminal device is connected to a Wi-Fi hotspot in the 2.4 GHz frequency band and does not support dual band dual concurrent (dual band dual concurrent, DBDC), the Wi-Fi P2P connection between the two terminal devices is negotiated to be established in the 2.4 GHz frequency band. Compared with a high frequency band such as the 5 GHz frequency band, a transmission rate of the 2.4 GHz frequency band is relatively low, and channel quality of the 2.4 GHz frequency band is also susceptible to interference from signals such as Bluetooth in the same frequency band, resulting in a relatively long time for Wi-Fi P2P data transmission, reducing user experience. For example, on the Wi-Fi P2P connection in the 2.4 GHz frequency band, it takes 3 minutes to transmit a 60 MB video file. This greatly wastes user time.

Therefore, an embodiment of this application provides a file transmission method. This method may be applied to file transmission between terminal devices, such as transmission of a photo, a video, audio, or a document. For ease of description, in this method, a terminal device sending data is referred to as a transmitter device, and a terminal device receiving data is referred to as a transmitter device. In this method, when the transmitter device transmits data to the receiver device, the transmitter device preferentially establishes the P2P connection in higher frequency bands of 5 GHz, 6 GHz, and the like with the receiver device, to prevent another wireless signal in a frequency band of less than 5 GHz from causing interference to the P2P connection between the transmitter device and the receiver device, so as to help improve a speed of file transmission between the transmitter device and the receiver device, improve stability of the P2P connection between the transmitter device and the receiver device, and shorten a file transmission time, thereby improving use experience of sharing, by a user, a file between two terminal devices.

FIG. 1 is a schematic diagram of a scenario to which an embodiment of this application is applicable. With reference to FIG. 1, the scenario may include two terminal devices. The two terminal devices may be connected to each other by using a communication network, to transmit data. The communication network may be, but is not limited to, a short-range communication network, such as a Wi-Fi hotspot network, a Wi-Fi peer-to-peer (peer-to-peer, P2P) network, a Bluetooth (bluetooth) network, a zigbee network, or a near field communication (near field communication, NFC) network. During data transmission, one of the terminal devices may be used as a transmitter device 100, and the other terminal device may be used as a receiver device 200. It should be supplemented herein that, the transmitter device 100 and the receiver device 200 are classified based on a file transmission direction. Based on different file transmission directions, any terminal device may be the transmitter device 100, or may be the receiver device 200.

The terminal device, for example, the transmitter device or the receiver device, may be a mobile terminal or a fixed terminal having a touchscreen, such as a mobile phone, a tablet computer (portable android device, PAD), a personal digital assistant (personal digital assistant, PDA), a handheld device having a wireless communication function, a computing device, an onboard device or a wearable device, a virtual reality (virtual reality, VR) terminal device, an augmented reality (augmented reality, AR) terminal device, a wireless terminal in industrial control (industrial control), a wireless terminal in self driving (self driving), a wireless terminal in remote medical (remote medical), a wireless terminal in a smart grid (smart grid), a wireless terminal in transportation safety (transportation safety), a wireless terminal in a smart city (smart city), or a wireless terminal in a smart home (smart home). A form of the terminal device is not specifically limited in this embodiment of this application. FIG. 1 shows an example in which the transmitter device is a mobile phone, and the receiver device is a tablet computer. Actual application is not limited thereto.

Figure 2:
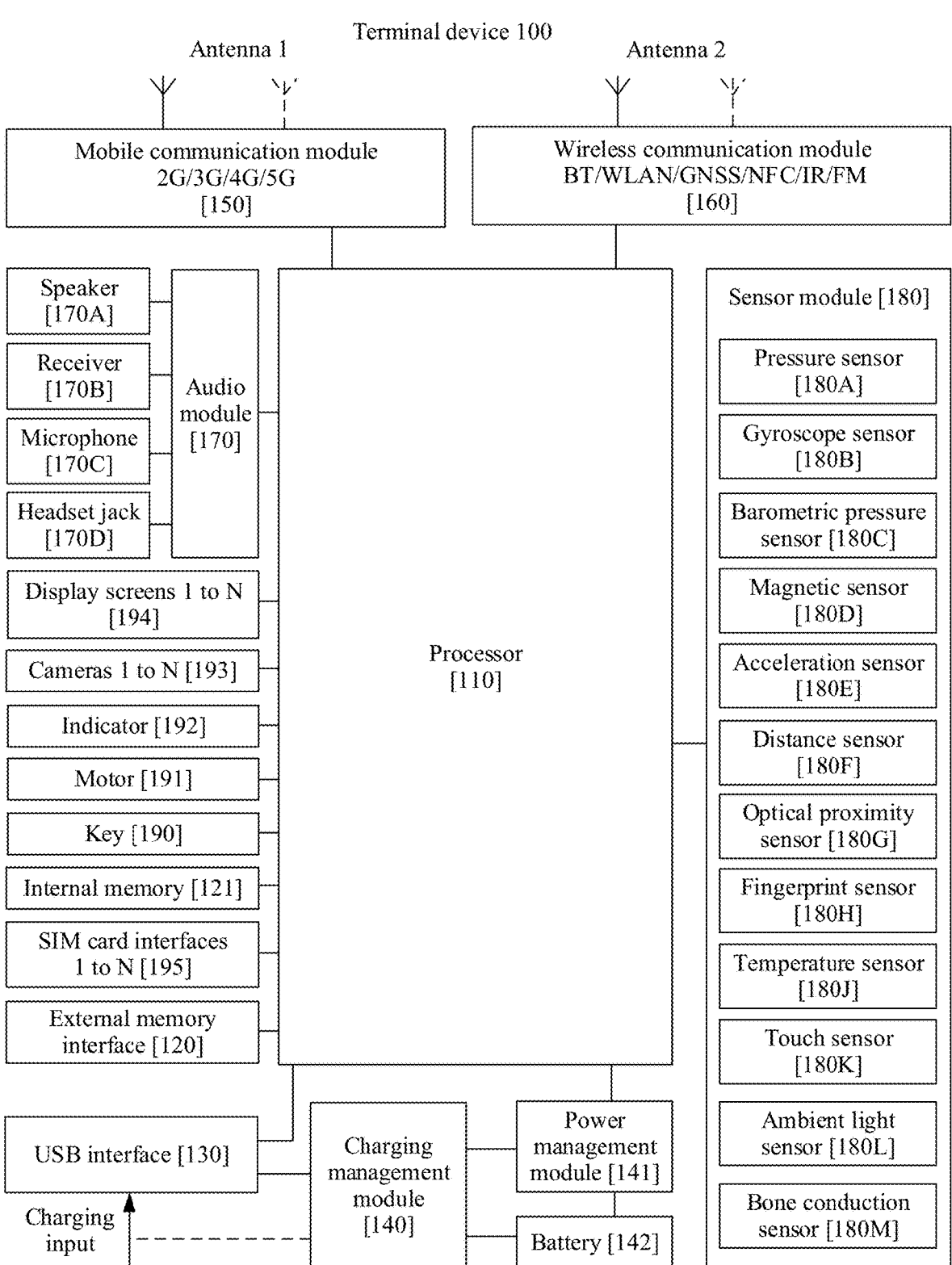
FIG. 2 is a schematic diagram of a hardware structure of a terminal device according to an embodiment of this application.

FIG. 2 is a schematic diagram of a structure of a terminal device according to an embodiment of this application. The terminal device 100 may be used as the transmitter device and the receiver device in FIG. 1. With reference to FIG. 2, the terminal device 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a key 190, a motor 191, an indicator 192, a camera 193, a display screen 194, a subscriber identification module (subscriber identification module, SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in this embodiment of the present invention does not constitute a specific limitation on the terminal device 100. In some other embodiments of this application, the terminal device 100 may include more or fewer components than those shown in the figure, or some components may be combined, or some components may be split, or components may be arranged in different manners. The components in the figure may be implemented by hardware, software or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, a neural-network processing unit (neural-network processing unit, NPU), and/or the like. The different processing units may be independent devices, or may be integrated into one or more processors. The controller can generate an operation control signal based on instruction operation code and a timing signal, and complete control of fetching and executing instructions.

The processor 110 may further be provided with a memory for storing instructions and data. In some embodiments the memory in the processor 110 is a cache memory. The memory may store instructions or data that has just been used or recycled by the processor 110. If the processor 110 needs to use the instructions or the data again, the processor 110 may directly invoke the instructions or the data from the memory.

The USB interface 130 is an interface that complies with a USB standard specification, and may be specifically a Mini USB interface, a Micro USB interface, a USB Type C interface, or the like. The USB interface 130 may be configured to connect to a charger to charge the terminal device 100, or may be used for data transmission between the terminal device 100 and a peripheral device. The USB interface 130 may also be configured to connect to a headset to play audio by using the headset. The interface may also be configured to connect to another terminal device, such as an AR device.

The charging management module 140 is configured to receive a charging input from the charger. The charger may be a wireless charger or may be a wired charger. In some embodiments of wired charging, the charging management module 140 may receive a charging input of a wired charger by using the USB interface 130. In some embodiments of wireless charging, the charging management module 140 may receive a wireless charging input by using a wireless charging coil of the terminal device 100. When charging the battery 142, the charging management module 140 may further supply power to the terminal device by using the power management module 141.

The power management module 141 is configured to connect to the battery 142, the charging management module 140, and the processor 110. The power management module 141 receives an input of the battery 142 and/or the charging management module 140, to supply power to the processor 110, the internal memory 121, the display screen 194, the camera 193, the wireless communication module 160, and the like. The power management module 141 may also be configured to monitor parameters such as a battery capacity, a quantity of battery cycles, and a battery health status (leakage and impedance). In some other embodiments, the power management module 141 may alternatively be disposed in the processor 110. In some other embodiments, the power management module 141 and the charging management module 140 may alternatively be disposed in a same device.

A wireless communication function of the terminal device 100 may be implemented by using the antenna 1, the antenna 2, the mobile communication module 150, the wireless communication module 160, a modem processor, a baseband processor, and the like.

The antenna 1 and the antenna 2 are configured to transmit and receive an electromagnetic wave signal. Each antenna in the terminal device 100 may be configured to cover a single communication frequency band or a plurality of communication frequency bands. Different antennas may be further multiplexed to increase antenna utilization. For example, the antenna 1 may be multiplexed as a diversity antenna of a wireless local area network. In some other embodiments, the antenna may be used together with a tuning switch.

The mobile communication module 150 may provide a wireless communication solution that is applied to the terminal device 100, including 2G/3G/4G/5G and the like. The mobile communication module 150 may include at least one filter, a switch, a power amplifier, a low noise amplifier (low noise amplifier, LNA), and the like. The mobile communication module 150 may receive an electromagnetic wave by using the antenna 1, perform processing, such as filtering and amplification, on the received electromagnetic wave, and transmit the processed electromagnetic wave to the modem processor for demodulation. The mobile communication module 150 may further amplify a signal modulated by the modem processor, and convert the signal into an electromagnetic wave by using the antenna 1 for radiation. In some embodiments, at least some of functional modules of the mobile communication module 150 may be disposed in the processor 110. In some embodiments, at least some of functional modules of the mobile communication module 150 may be disposed in a same device as at least some of modules of the processor 110.

The modem processor may include a modulator and a demodulator. The modulator is configured to modulate a to-be-sent low frequency baseband signal into a medium-high frequency signal. The demodulator is configured to demodulate a received electromagnetic wave signal into a low frequency baseband signal. Then, the demodulator sends the low frequency baseband signal obtained through demodulation to the baseband processor for processing. The low frequency baseband signal is transmitted to the application processor after being processed by the baseband processor. The application processor outputs a sound signal by using an audio device (which is not limited to the speaker 170A, the receiver 170B, and the like), or displays an image or a video by using the display screen 194. In some embodiments, the modem processor may be an independent device. In some other embodiments, the modem processor may be independent of the processor 110, and the modem processor and the mobile communication module 150 or another functional module may be disposed in a same device.

The wireless communication module 160 may provide a wireless communication solution to be applied to the terminal device 100, including a wireless local area network (wireless local area networks, WLAN) (such as a Wi-Fi network), Bluetooth, and the like. The wireless communication module 160 may be one or more devices integrating at least one communication processing module.

The terminal device 100 implements a display function by using the GPU, the display screen 194, the application processor, and the like. The GPU is an image processing microprocessor, and is connected to the display screen 194 and the application processor. The GPU is configured to perform mathematical and geometric calculation for graphics rendering. The processor 110 may include one or more GPUs, and the one or more GPUs execute program instructions to generate or change display information.

The terminal device 100 may implement a photographing function by using the ISP, the camera 193, the video codec, the GPU, the display screen 194, the application processor, and the like.

The external memory interface 120 may be configured to connect to an external storage card such as a Micro SD card, to expand a storage capability of the terminal device 100. The external storage card communicates with the processor 110 by using the external memory interface 120, to implement a data storage function, for example, to store music, videos, and other files into the external storage card.

The internal memory 121 may be configured to store computer-executable program code. The executable program code includes instructions. The internal memory 121 may include a storage program area and a storage data area. The program storage area may store an operating system, an application required by at least one function (for example, a file transmission function or an album function), and the like. The data storage area may store data (such as files, photos, and videos) created during use of the terminal device 100.

The terminal device 100 may implement an audio function, for example, music playing or sound recording, by using the audio module 170, the speaker 170A, the receiver 170B, the microphone 170C, the headset jack 170D, the application processor, and the like.

The pressure sensor 180A is configured to sense a pressure signal, and may convert the pressure signal into an electrical signal. In some embodiments, the pressure sensor 180A may be disposed on the display screen 194. When a touch operation acts on the display screen 194, the terminal device 100 detects intensity of the touch operation based on the pressure sensor 180A. The terminal device 100 may also calculate a touch position based on a detection signal of the pressure sensor 180A. In some embodiments, touch operations acting at the same touch position but with different touch operation intensities may correspond to different operation instructions.

The gyroscope sensor 180B may be configured to determine a motion posture of the terminal device 100. In some embodiments, an angular velocity of the terminal device 100 around three axes (namely, x, y, and z axes) may be determined by using the gyroscope sensor 180B.

The barometric pressure sensor 180C is configured to measure barometric pressure. In some embodiments, the terminal device 100 calculates an altitude by using a barometric pressure value measured by the barometric pressure sensor 180C, to assist in positioning and navigation.

The magnetic sensor 180D includes a Hall sensor. The terminal device 100 may detect opening and closing of a flip holster by using the magnetic sensor 180D. In some embodiments, when the terminal device 100 is a foldable-display mobile phone, the terminal device 100 may detect opening and closing of the foldable-display mobile phone based on the magnetic sensor 180D.

The acceleration sensor 180E may detect magnitudes of accelerations of the terminal device 100 in various directions (generally three axes). When the terminal device 100 is stationary, a magnitude and a direction of gravity may be detected.

The distance sensor 180F is configured to measure a distance. The terminal device 100 may measure the distance by using infrared or laser.

The optical proximity sensor 180G may include, for example, a light-emitting diode (LED) and a photodetector, for example, a photodiode. The light-emitting diode may be an infrared light-emitting diode. The terminal device 100 emits infrared light by using the light-emitting diode. The terminal device 100 detects infrared reflected light from a nearby object by using the photodiode. When sufficient reflected light is detected, it may be determined that there is an object near the terminal device 100. When insufficient reflected light is detected, the terminal device 100 may determine that there is no object near the terminal device 100.

The ambient light sensor 180L is configured to sense luminance of ambient light. The terminal device 100 may adaptively adjust luminance of the display screen 194 based on the sensed luminance of ambient light. The ambient light sensor 180L may also be configured to automatically adjust white balance during photographing. The ambient light sensor 180L may further cooperate with the optical proximity sensor 180G to detect whether the terminal device 100 is in a pocket, so as to prevent accidental touch.

The fingerprint sensor 180H is configured to acquire a fingerprint. The terminal device 100 may implement fingerprint unlock, application lock access, fingerprint-based photographing, fingerprint-based call answering, and the like by using a feature of the acquired fingerprint.

The temperature sensor 180J is configured to detect a temperature. In some embodiments, the terminal device 100 executes a temperature processing policy by using the temperature detected by the temperature sensor 180J.

The touch sensor 180K is also referred as a "touch device". The touch sensor 180K may be disposed on the display screen 194. The touch sensor 180K and the display screen 194 form a touchscreen. The touch sensor 180K is configured to detect a touch operation acting on or near the touch sensor 180K. The touch sensor may transfer a detected touch operation to the application processor to determine a touch event type. A visual output related to the touch operation may be provided by using the display screen 194.

The bone conduction sensor 180M may obtain a vibration signal. In some embodiments, the bone conduction sensor 180M may obtain a vibration signal of a vibration bone block of a body vocal-cord part. The bone conduction sensor 180M may also contact a body pulse, to receive a blood pressure beating signal. In some embodiments, the bone conduction sensor 180M may also be disposed in a headset, to combine into a bone conduction headset. The audio module 170 may parse out a voice signal based on the vibration signal that is of the vibration bone block of the vocal-cord part and that is obtained by the bone conduction sensor 180M, to implement a voice function.

The key 190 includes a power-on key, a volume key, and the like. The key 190 may be a mechanical key, or may be a touch key. The terminal device 100 may receive a key input, generate a key signal input related to a user setting and function control of the terminal device 100.

The motor 191 may generate a vibration prompt. The motor 191 may be configured to provide a vibration prompt for an incoming call, and may also be configured to provide a vibration feedback for touch. For example, touch operations that act on different applications (such as photographing and audio playing) may correspond to different vibration feedback effects. For touch operations performed in different regions of the display screen 194, the motor 191 may also correspond to different vibration feedback effects.

The indicator 192 may be an indicator light that may be configured to indicate a charging state and a power change, or may be configured to indicate a message, a missed call, a notification, and the like.

The SIM card interface 195 is configured to connect to a SIM card. The SIM card may be inserted into the SIM card interface 195 or plugged from the SIM card interface 195 to come into contact with or be separated from the terminal device 100. The terminal device 100 may support one or N SIM card interfaces. N is a positive integer greater than 1. The SIM card interface 195 may support a Nano SIM card, a Micro SIM card, a SIM card, and the like. A plurality of cards may be inserted into the same SIM card interface 195 simultaneously. Types of the plurality of cards may be the same or different. The SIM card interface 195 may be further compatible with SIM cards of different types. The SIM card interface 195 may also be compatible with external memory cards. The terminal device 100 interacts with a network by using the SIM card, to implement a call function, a data communication function, and the like.

It is apparent to a person skilled in the art that some of the specific details presented above with respect to the terminal device 100 may not be required to practice specific implementations or their equivalents. Similarly, other terminal devices may include more modules, components, and the like. Some modules may be implemented as software or hardware in proper cases. Therefore, it should be understood that the foregoing description is not intended to be exhaustive or to limit this application to the accurate form described in this specification. On the contrary, it is apparent to a person of ordinary skill in the art that many modifications and variations are possible based on the foregoing teachings.

A software system of the electronic device 100 may use a layered architecture, an event-driven architecture, a microkernel architecture, a microservice architecture, or a cloud architecture. In an embodiment of the present invention, a software structure of the electronic device 100 is described by using an Android system with a layered architecture as an example.

Figure 3:
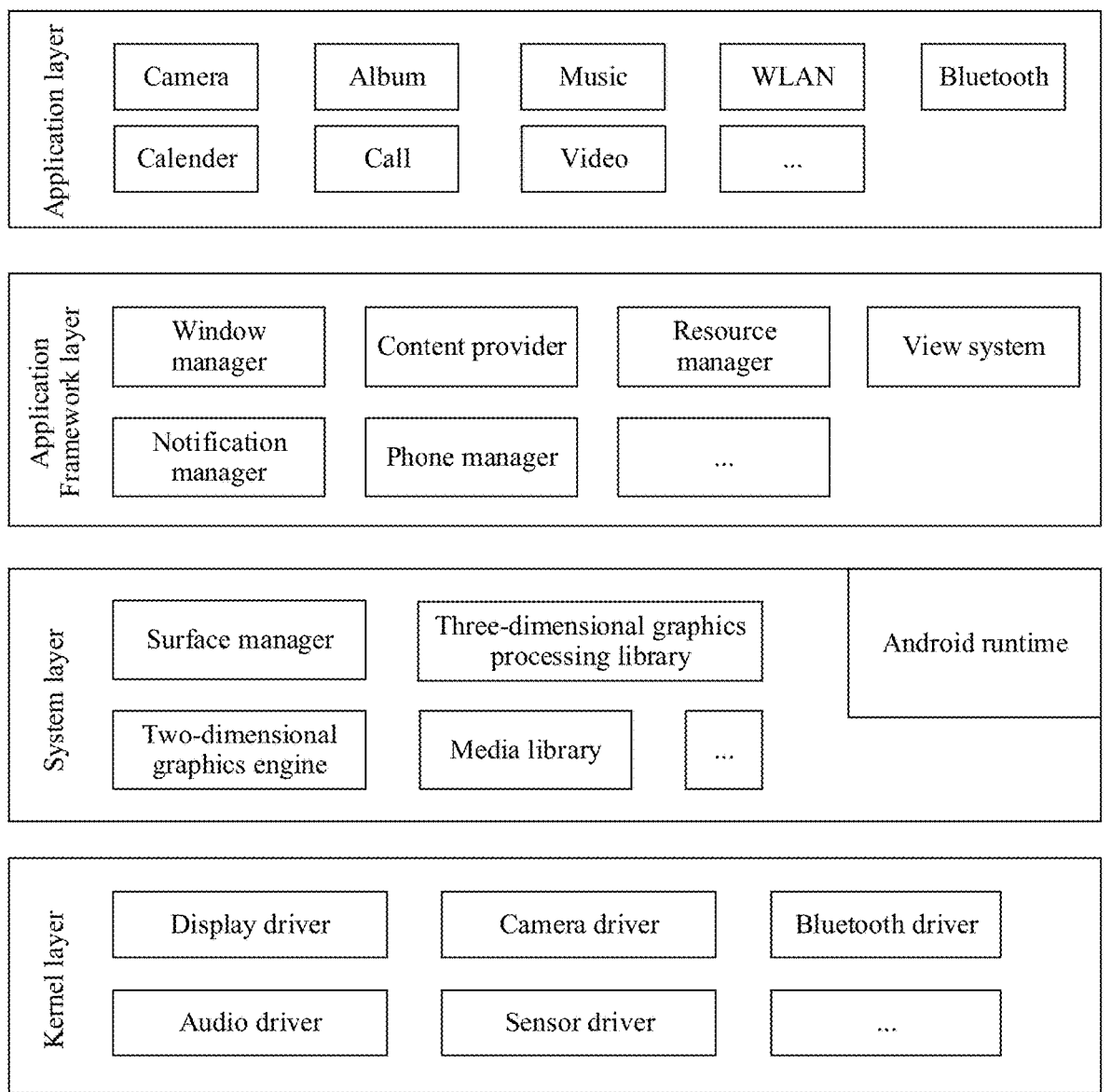
FIG. 3 is a schematic diagram of a software structure of a terminal device according to an embodiment of this application.

FIG. 3 is a block diagram of a software structure of an electronic device 100 according to an embodiment of the present invention.

The layered architecture divides software into several layers, each with a clear role and division of labor. The layers communicate with each other by using software interfaces. In some embodiments, the Android system is divided into four layers, which are respectively an application layer, an application framework layer, an Android runtime (Android runtime), a system library, and a kernel layer from top to bottom.

The application layer may include a series of application packages.

As shown in FIG. 3, the application packages may include applications such as Camera, Album, Calendar, Call, Map, Navigation, WLAN, Bluetooth, Music, Video, and SMS message.

The application framework layer provides an application programming interface (application programming interface, API) and a programming framework for an application of the application layer. The application framework layer includes some predefined functions.

As shown in FIG. 3, the application framework layer may include a window manager, a content provider, a view system, a phone manager, a resource manager, a notification manager, and the like.

The window manager is configured to manage a window program. The window manager may obtain a size of a display screen, determine whether there is a status bar, lock the screen, capture the screen, and the like.

The content provider is configured to: store and obtain data and make the data accessible to an application. The data may include a video, an image, audio, calls made and answered, a browse history and a bookmark, a personal address book, and the like.

The view system includes a visual control, for example, a control for displaying text or a control for displaying a picture. The view system can be configured to build an application. The display interface may include one or more views. For example, a display interface including a short message service message notification icon may include a view that displays text and a view that displays pictures.

The phone manager is configured to provide a communication function of the electronic device 100, for example, call status management (including call connection and disconnection, and the like).

The resource manager provides various resources for an application, such as a localized string, an icon, a picture, a layout file, and a video file.

The notification manager enables an application to display, in the status bar, notification information, which can be used for conveying a notification-type message that can automatically disappear after a short stay without user interaction. For example, the notification manager is configured to: notify download completion, and remind a message, and the like. The notification manager may alternatively be a notification that appears in a status bar on top of the system in a form of a chart or scroll bar text, for example, a notification of an application running in the background, or a notification that appears on the screen in a form of a dialog window. For example, text information is prompted in the status bar, a prompt tone is issued, an electronic device vibrates, or an indicator light flashes.

The Android Runtime includes a core library and a virtual machine. The Android runtime is responsible for scheduling and managing the Android system.

The core library includes two parts: one is a performance function that a Java language needs to invoke, and the other is a core library of Android.

The application layer and the application framework layer run in the virtual machine. The virtual machine executes Java files of the application layer and application framework layer as binary files. The virtual machine is configured to execute functions such as object life cycle management, stack management, thread management, security and exception management, and garbage collection.

The system library may include a plurality of functional modules, for example, a surface manager (surface manager), a media library (Media Libraries), a three-dimensional graphics processing library (for example, an OpenGL ES), a 2D graphics engine (for example, an SGL), and the like.

The surface manager is configured to manage a display subsystem, and provides a fusion of 2D and 3D layers for a plurality of applications.

The media library supports playback and recording of a plurality of common audio and video formats, a still image file, and the like. The media library may support a plurality of audio and video encoding formats, such as: MPEG4, H.264, MP3, AAC, AMR, JPG, and PNG.

The three-dimensional graphics processing library is configured to implement three-dimensional graphics drawing, image rendering and synthesis, layer processing, and the like.

The 2D graphics engine is a drawing engine for 2D drawing.

The kernel layer is a layer between hardware and software. The kernel layer includes at least a display driver, a camera driver, an audio driver, a sensor driver, and a Bluetooth driver.

The following describes examples of working procedures of software and hardware of the electronic device 100 with reference to a photo sharing scenario.

When the touch sensor 180K receives a touch operation, a corresponding hardware interrupt is sent to the kernel layer. The kernel layer processes the touch operation into an original input event (including information such as coordinates of touch and a timestamp of the touch operation). The original input event is stored at the kernel layer. The application framework layer obtains the original input event from the kernel layer, and recognizes a control corresponding to the input event.

By using an example in which the touch operation is a touch single-tap operation, and a control corresponding to the single-tap operation is a control of a sharing switch icon in a notification panel application, a sharing application invokes an interface of the application framework layer to start the sharing application. By using an example in which the touch operation is a touch single-tap operation and a control corresponding to the single-tap operation is a control of a sharing icon in an album application, the album application invokes a sharing application by invoking an interface of the application framework layer, to further start a Bluetooth driver by invoking the kernel layer, thereby sending BLE broadcast including a file sharing request by using Bluetooth, exchanging P2P information with a peer device by using the BLE, and the like.

FIG. 4 is a flowchart of a file sharing method according to an embodiment of this application.

As shown in FIG. 4, the method may include the following steps.

Step S401: After receiving a file sharing request of a transmitter device, if the receiver device is currently connected to a 2.4 GHz Wi-Fi network and does not support dual band dual concurrent DBDC, the receiver device establishes a peer-to-peer P2P connection in a target frequency band with the transmitter device, where the target frequency band includes frequency bands of 5 GHz and above.

The target frequency band may be a frequency band of 5 GHz or above that is currently used for the Wi-Fi network or that may be subsequently used for the Wi-Fi network, for example, a 5 GHz frequency band, a 6 GHz frequency band, or a higher frequency band that may appear in the future with a Wi-Fi protocol standard.

In this embodiment of this application, the target frequency band is configured to be a frequency band of 5 GHz or above, to prevent another wireless signal in a frequency band of less than 5 GHz from causing interference to the P2P connection between the transmitter device and the receiver device, thereby helping improve a speed of file transmission between the transmitter device and the receiver device. For example, based on a conventional solution, if the receiver device and/or the transmitter device are currently connected to a Wi-Fi hotspot in the 2.4 GHz frequency band, the receiver device establishes the P2P connection in the 2.4 GHz frequency band with the transmitter device. As a result, the P2P connection is subjected to interference from surrounding Bluetooth and Wi-Fi signals in the same frequency band, reducing a file transmission speed. If the receiver device establishes the P2P connection in the 5 GHz frequency band with the transmitter device, low-frequency Wi-Fi and Bluetooth signals in a frequency band of less than 5 GHz do not cause interference to the P2P connection, and a connection speed of Wi-Fi of the 5 GHz frequency band is higher than that of 2.4 GHz. This helps improve the file transmission speed between the transmitter device and the receiver device.

The target frequency band may be the 5 GHz frequency band. When the receiver device is currently connected to the Wi-Fi hotspot in the 5 GHz frequency band, if both devices support the 6 GHz frequency band, the target frequency band may be the 6 GHz frequency band.

Step S402: The receiver device receives, by using the P2P connection, a file sent by the transmitter device.

In a specific implementation, the file sent by the transmitter device to the receiver device may be a photo, a video, audio, a document, or the like. This is not limited in this embodiment of this application. Because the transmitter device establishes the P2P connection in a higher wireless frequency band with the receiver device, another wireless signal in a frequency band of less than 5 GHz is prevented from causing interference to the P2P connection between the transmitter device and the receiver device, so as to help improve a speed of file transmission between the transmitter device and the receiver device, improve stability of the P2P connection between the transmitter device and the receiver device, and shorten a file transmission time, thereby improving use experience of sharing, by a user, a file between two terminal devices.

The file sharing method provided in this embodiment of this application is described in more detail below by using an example in which the receiver device is currently connected to the Wi-Fi hotspot in the 2.4 GHz frequency band, the target frequency band is a 5 GHz frequency band, and a file is transmitted between the receiver device and the transmitter device based on the Wi-Fi P2P connection.

Figure 5:
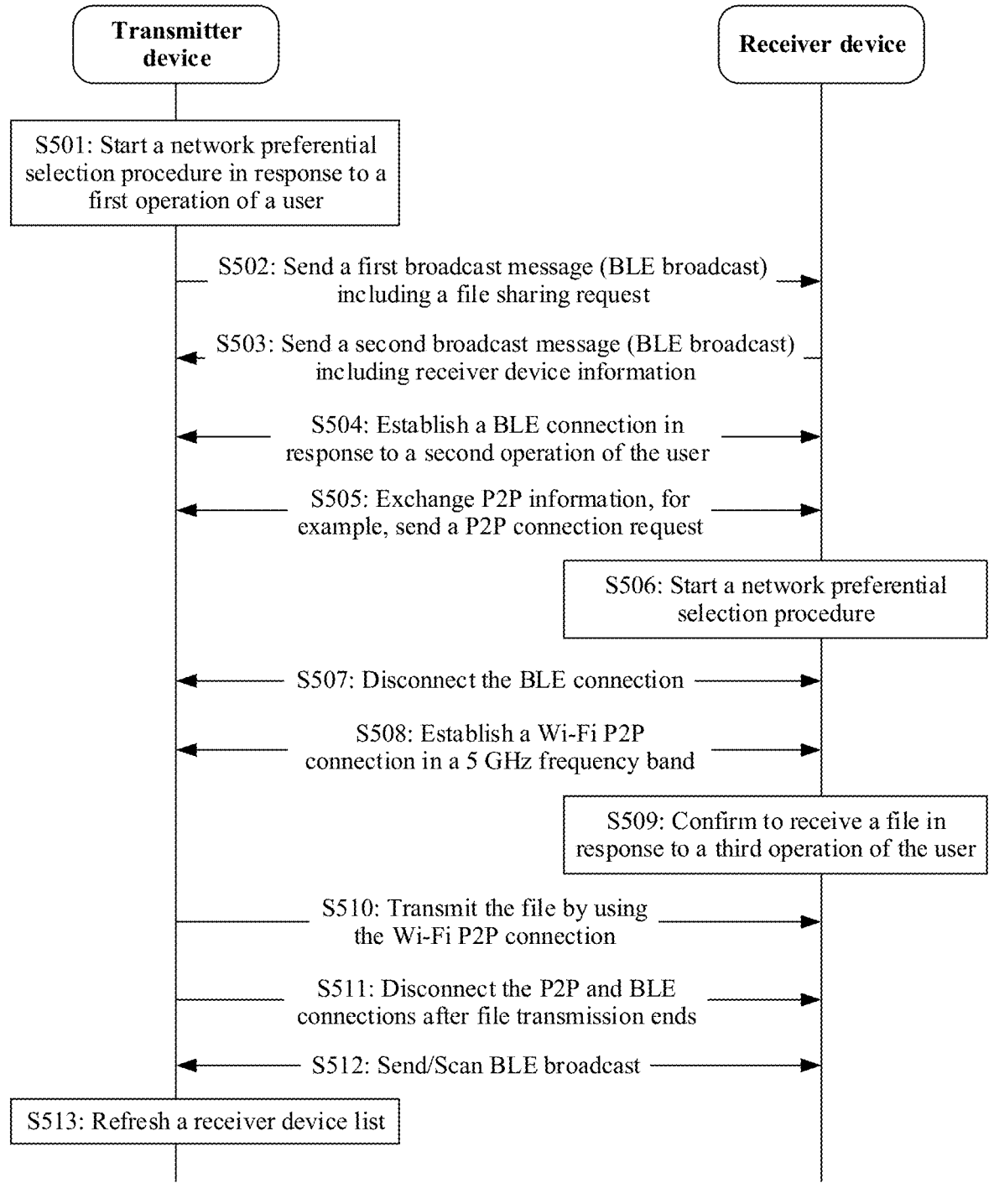
FIG. 5 is a specific flowchart of a file sharing method according to an embodiment of this application.

FIG. 5 is a specific flowchart of a file sharing method according to an embodiment of this application.

As shown in FIG. 5, in an implementation, the method may be implemented by using the following steps.

S501: A receiver device starts a network preferential selection procedure in response to a first operation of a user.

In an implementation, the first operation may be one or more touch operations performed by the user on the receiver device.

For example, the first operation may include an operation of switching on a sharing switch on a terminal device by the user.

Figure 6A:
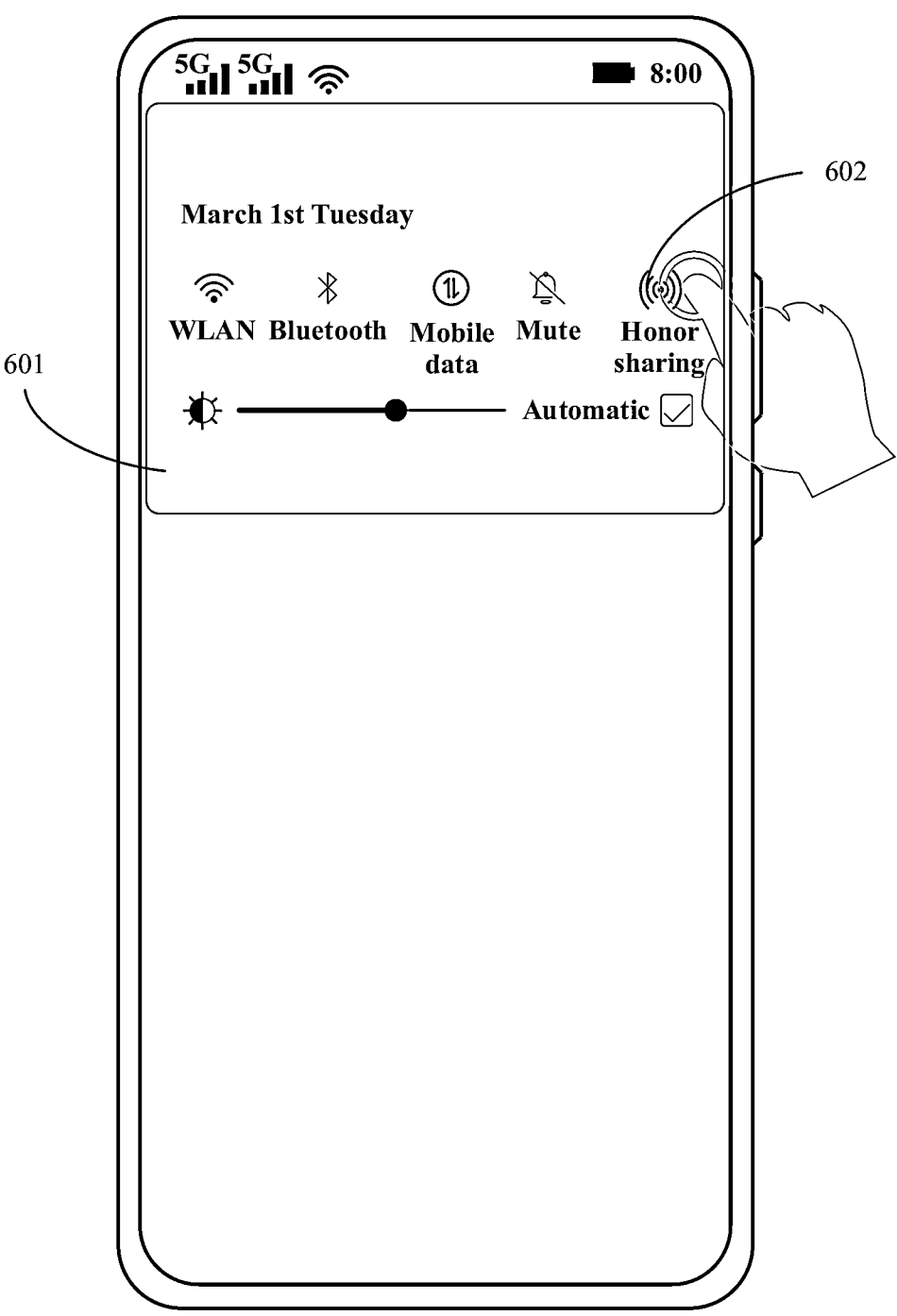
FIG. 6*a* is a schematic diagram showing that a user switches on a sharing switch according to an embodiment of this application.

With reference to FIG. 6*a*, both the receiver device and the transmitter device may switch on the file sharing switch in response to the one or more touch operations of the user. The sharing switch may be located, for example, in a notification panel of the receiver device or the transmitter device. In this way, when the user needs to share a file, the transmitter device and the receiver device may call out a notification panel 501 in response to a downward swiping action of the user in a status bar, and then switch on the sharing switch in response to an action of the user of tapping a sharing switch button 601 in the notification panel. In a state in which the sharing switch is switched on, if the user taps the sharing switch button 602 again, the sharing switch may be switched off. After the receiver device switches on the sharing switch, the network preferential selection procedure may be started. The network preferential selection procedure is used for subsequent establishment of a Wi-Fi P2P connection in a frequency band of 5 GHz or above with the transmitter device.

In another implementation, the first operation may include a voice input operation performed by the user on the receiver device. Using an example in which the user shares a photo in an album application, the user may call out a voice assistant of the receiver device or the transmitter device by using a specific voice token. For example, when the user says "Hello, yoyo" to the receiver device, the receiver device starts the voice assistant and waits for the user to say another instruction. The voice assistant may also be started in a manner in which the user taps a specified ion or key on the receiver device or the transmitter device. This is not limited in this application. Next, when the user says to the voice assistant: "Start file sharing", the receiver device may switch on the sharing switch, and starts the network preferential selection procedure.

It may be understood that, in addition to touch and voice operations, the receiver device and the transmitter device may also switch on or off the file sharing switch or start the network preferential selection procedure in response to other operations of the user. Operations that can be implemented include but are not limited to a cross-space gesture operation, a device shaking operation, an operation of moving the receiver device to a position near the transmitter device, and the like. This is not limited in this embodiment of this application.

Figure 6B:
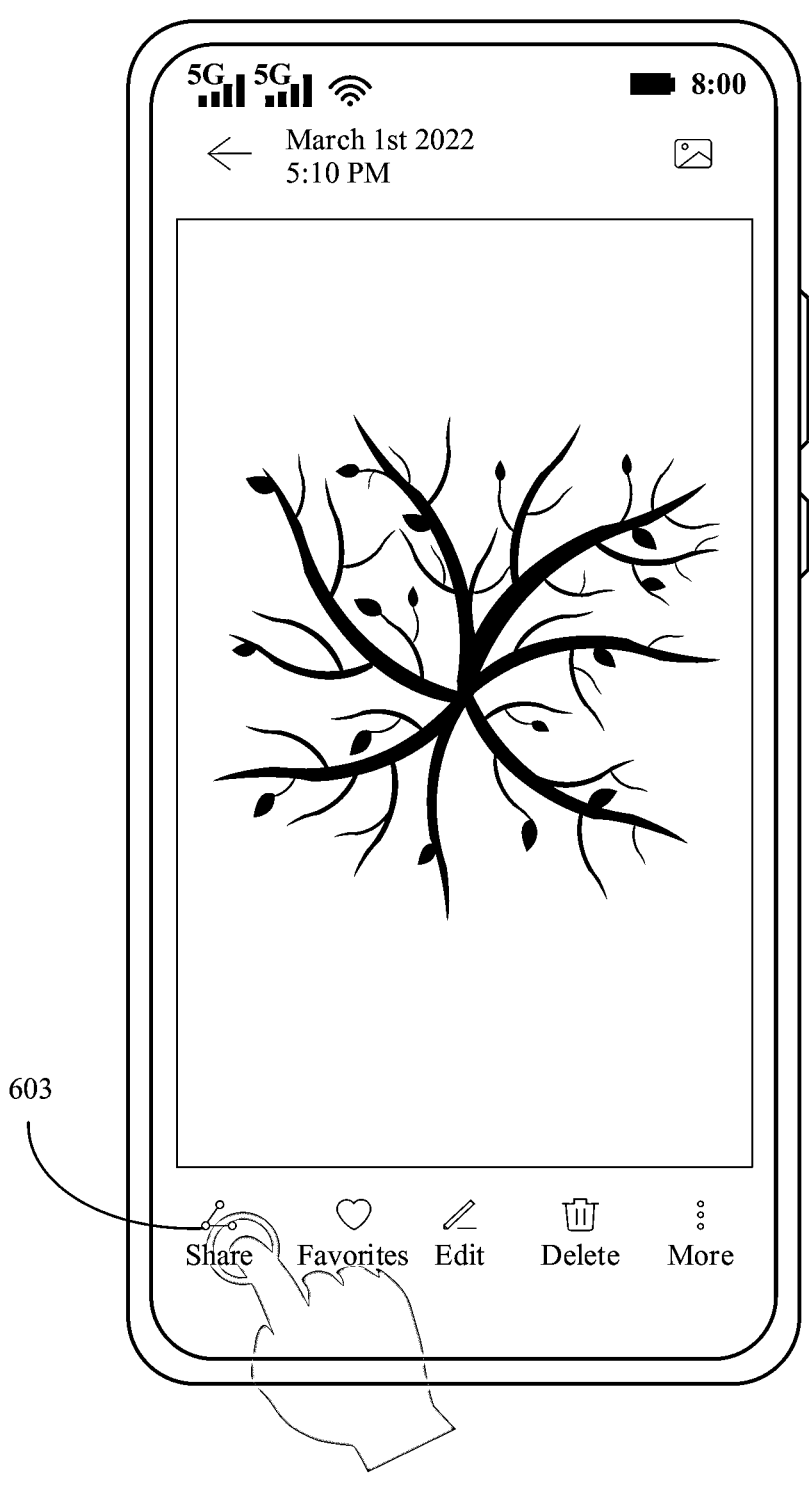
FIG. 6*b* is a schematic diagram showing that a user taps a sharing button according to an embodiment of this application.

For another example, after the user switches on the sharing switch, the first operation may further include an operation of selecting a to-be-shared file and tapping a sharing button by the user. By using an example in which the user shares a photo in an album application, with reference to FIG. 6*b*, when the user performs an operation of tapping, holding, or sliding at least one photo, photo thumbnail, or photo folder in an album, the transmitter device may select at least one photo in response to the operation, and display a sharing button 603 in an album page. Next, if the user wants to share this photo, the user may tap the sharing button 603. The transmitter device may start the network preferential selection procedure in response to the operation of tapping the sharing button 603 by the user.

In addition, after the transmitter device and the receiver device switch on the sharing switch, both the transmitter device and the receiver device perform BLE background scanning, to scan whether there is BLE broadcast sent by other surrounding devices.

After starting the network preferential selection procedure, the receiver device may continue to perform the following steps.

Step S502: The transmitter device sends a first broadcast message including a file sharing request.

The first broadcast message may be a Bluetooth broadcast message, for example, a Bluetooth low energy BLE broadcast message. The transmitter device may also add its own device identifier to the first broadcast message, so that other terminal devices can identify an identity of the transmitter device based on the device identifier. The device identifier of the transmitter device may be a Bluetooth address or an equivalent address of the transmitter device. It may be understood that, in this embodiment of this application, the transmitter device may also add its own other information to the first broadcast message as the device identifier. This is not limited in this embodiment of this application.

Step S503: The receiver device sends a second broadcast message to the transmitter device in response to the first broadcast message.

The second broadcast message may be a Bluetooth broadcast message, for example, a Bluetooth low energy BLE broadcast message. The second broadcast message may include receiver device information, for example, a device name.

In an implementation, the receiver device sets different security settings for a file sharing function. For example, the receiver device may set to receive only files shared by its saved terminal devices (that is, contacts saved by the receiver device), or may be set to be visible to any device, that is, to receive files shared by any terminal device.

In an implementation, after receiving the first broadcast message, the receiver device may determine, based on its own security settings and the device name of the transmitter device, whether to send the second broadcast message to the transmitter device. For example, if the receiver device receives only files shared by its saved contacts to the receiver device, the receiver device may query, based on the device name of the transmitter device, whether its saved contacts include the transmitter device. If the transmitter device is included, the receiver device sends the second broadcast message to the transmitter device. For another example, if the receiver device receives files shared by any terminal device to the receiver device, the receiver device may directly send the second broadcast message to the transmitter device after receiving the first broadcast message.

After receiving the second broadcast message, the transmitter device may query, based on the device name of the receiver device, whether the receiver device is a contact saved by the transmitter device. If the receiver device is a contact saved by the transmitter device, the transmitter device displays a contact portrait corresponding to the receiver device to the user. If the receiver device is not a contact saved by the transmitter device, the transmitter device displays an empty portrait corresponding to the receiver device.

In an implementation, after receiving the first broadcast message and confirming that a file can be received from the transmitter device, the receiver device may continuously send broadcast messages to the transmitter device to confirm its existence to transmitter device. If the transmitter device no longer receives a broadcast message from the receiver device, it indicates that the receiver device has moved away. In this case, the transmitter device may delete the portrait that is displayed by the transmitter device and that is of the receiver device.

It should be supplemented herein that, after the transmitter device broadcasts the first broadcast message, if there are a plurality of terminal devices around the receiver device, the receiver device may receive second broadcast messages sent by the plurality of terminal devices. In this case, the receiver device displays contact portraits of the plurality of terminal devices to the user.

Step S504: The transmitter device establishes a BLE connection with the receiver device in response to a second operation of the user.

In an implementation, the second operation may be one or more touch operations performed by the user on the transmitter device.

For example, the second operation may include an operation of tapping a contact portrait on the transmitter device by the user.

Figure 6C:
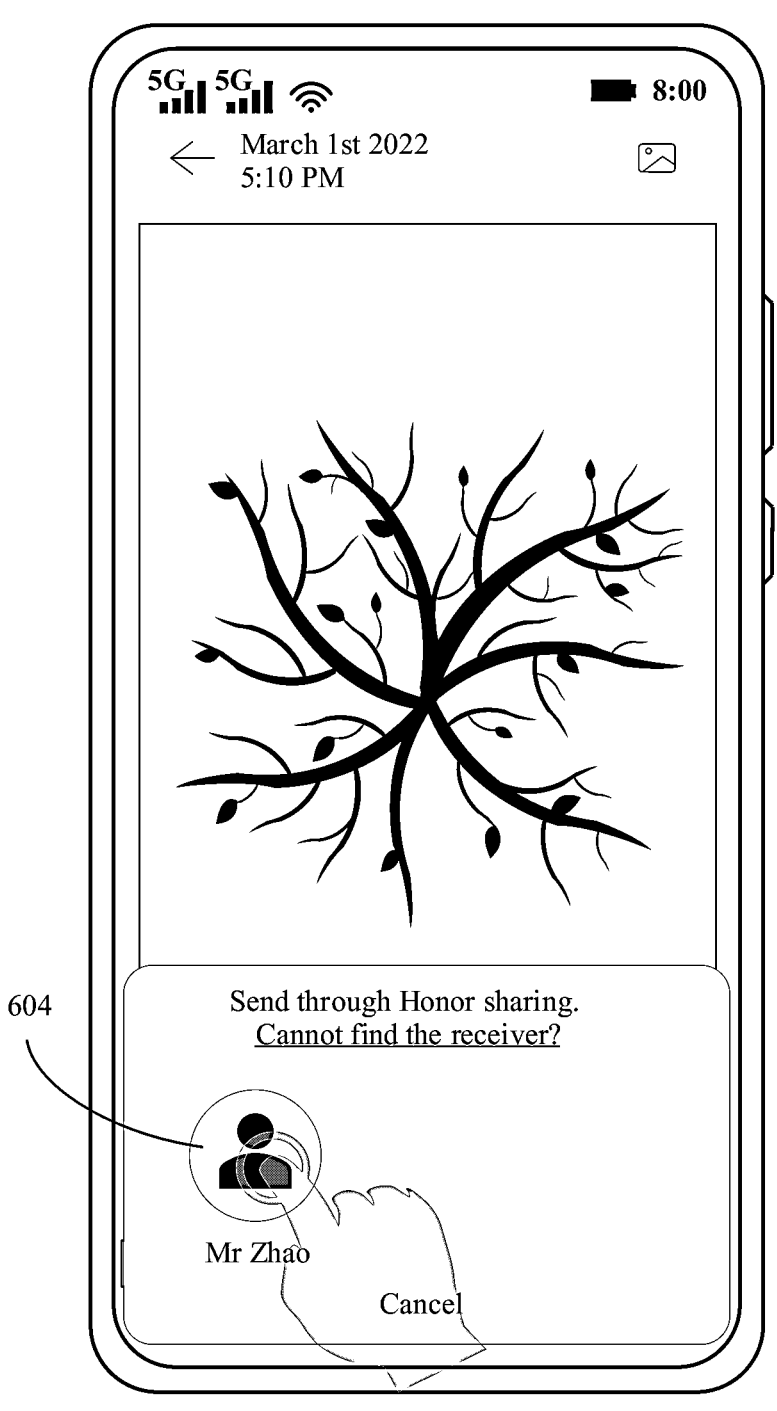
FIG. 6*c* is a schematic diagram showing that a user taps a contact portrait according to an embodiment of this application.

By using an example in which the user shares a photo in the album application, with reference to FIG. 6c, after the transmitter device displays a contact portrait 604, the user may tap the contact portrait 604, to confirm a receiver device of photo sharing this time. The transmitter device triggers to establish the BLE connection with the receiver device in response to the tap operation of the user.

In another implementation, the second operation may include a voice input operation performed by the user on the transmitter device.

By using an example in which the user shares a photo in the album application, after the transmitter device displays the contact portrait 604, the user may directly say a name of any contact to the receiver device, for example, "Send to Mr Zhao", to confirm that the receiver device of photo sharing this time is a tablet computer of Mr Zhao. The transmitter device may trigger to establish the BLE connection with the tablet computer of Mr Zhao in response to the voice input operation of the user.

Next, the transmitter device and the receiver device may exchange, by using the BLE connection, information about the Wi-Fi P2P connection established by the user. The BLE connection is preferentially an encrypted connection, to improve security of information transmission.

Step S505: The transmitter device sends, by using the BLE connection, a P2P connection request to the receiver device.

The file transmission request may be used to trigger the receiver device to start the network preferential selection procedure, and used to trigger the receiver device to establish the Wi-Fi P2P connection with the transmitter device, to receive a file.

S506: The receiver device starts the network preferential selection procedure.

In a specific implementation, if the receiver device is currently connected to 2.4 GHz Wi-Fi and does not support dual band dual concurrent DBDC, the receiver device starts the network preferential selection procedure. The network preferential selection procedure is used for the receiver device to switch from the 2.4 GHz Wi-Fi network to a Wi-Fi network in a frequency band of 5 GHz or above.

Figure 7:
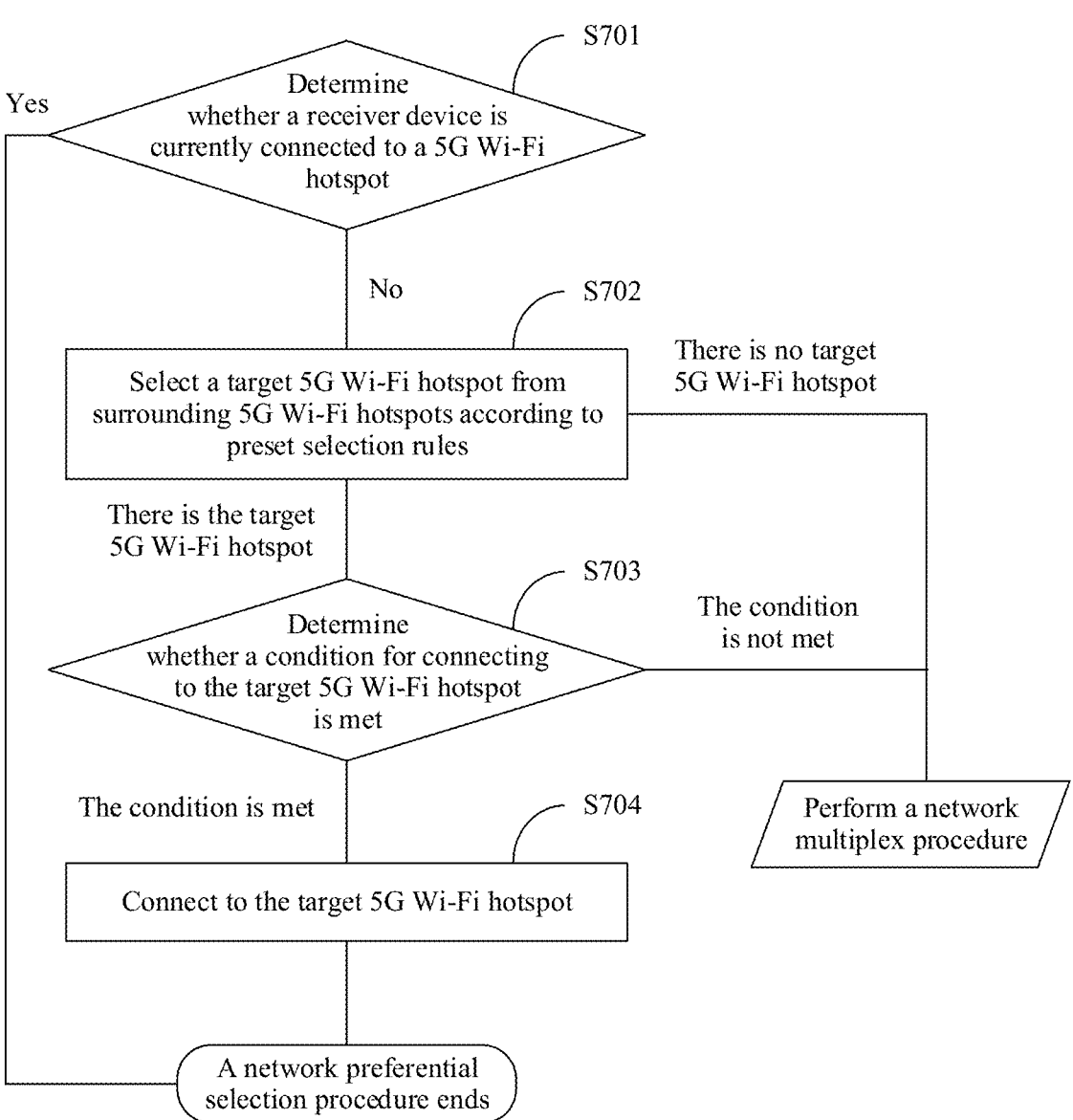
FIG. 7 is a schematic diagram of a network preferential selection procedure according to an embodiment of this application.

With reference to FIG. 7, in an implementation, the network preferential selection procedure of the receiver device may be implemented by using the following steps.

Step S701: The receiver device determines whether the receiver device is currently connected to a Wi-Fi hotspot in the 5 GHz frequency band (a 5G Wi-Fi hotspot for short below). If the receiver device is currently connected to the 5G Wi-Fi hotspot, the Wi-Fi P2P connection preferential selection procedure of the receiver device ends. If the receiver device is not currently connected to the 5G Wi-Fi hotspot, step S602 is performed.

It should be understood that, the Wi-Fi network may be currently implemented in the 2.4 GHz frequency band and the 5 GHz frequency band. Therefore, when the receiver device simultaneously supports Wi-Fi protocols of the 2.4 GHz frequency band and the 5 GHz frequency band, the receiver device may be currently connected to the Wi-Fi hotspot in the 2.4 GHz frequency band (a 2.4G Wi-Fi hotspot for short below), or may be connected to the 5G Wi-Fi hotspot. This specifically depends on whether there is the 5G Wi-Fi hotspot or the 2.4G Wi-Fi hotspot around the receiver device, a signal strength of the Wi-Fi hotspot, a selection of the user, and the like. Details are not described herein.

Step S702: The receiver device selects a target 5G Wi-Fi hotspot from surrounding 5G Wi-Fi hotspots according to preset selection rules.

In this embodiment of this application, the selection rules may be determined based on features of one or more aspects related to a file transmission speed, such as a signal strength, a network standard, channel quality, and a frequency band of the Wi-Fi hotspot. This is not specifically limited in this embodiment of this application.

It may be understood that, under evaluation of the selection rules, there may or may not be the target 5G Wi-Fi hotspot that meets the selection rules around the receiver device. If there is the target 5G Wi-Fi hotspot, the receiver device performs step S703. If there is no target 5G Wi-Fi hotspot, the receiver device performs a 5G Wi-Fi multiplex procedure.

In a specific implementation, if the receiver device is not connected to the 5G Wi-Fi hotspot, the receiver device may scan a surrounding 5G Wi-Fi hotspot. If there is no 5G Wi-Fi hotspot around, the receiver device determines that there is no target 5G Wi-Fi hotspot around, and the receiver device performs the 5G Wi-Fi multiplex procedure. If there are one or more 5G Wi-Fi hotspots around the receiver device, the receiver device may determine, according to the following selection rules, whether there is the target 5G Wi-Fi hotspot in the 5G Wi-Fi hotspots around the receiver device, and select the target 5G Wi-Fi hotspot.

Rule 1: When the receiver device is currently connected to the 2.4G Wi-Fi hotspot, if there is a 5G Wi-Fi hotspot that is around the receiver device and that belongs to a same access point AP device as the 2.4G Wi-Fi hotspot to which the receiver device is currently connected, and the 5G Wi-Fi hotspot has a received signal strength indicator RSSI value greater than a first preset threshold, the 5G Wi-Fi hotspot is preferentially selected as the target 5G Wi-Fi hotspot. The first threshold may be, for example, −65 dB. This is not limited in this embodiment of this application.

Rule 2: The receiver device may select a 5G Wi-Fi hotspot with a largest quantity of signal bars from a plurality of 5G Wi-Fi hotspots around the receiver device based on a principle of a priority in a quantity of signal bars. If there is only one 5G Wi-Fi hotspot with the largest quantity of signal bars, the 5G Wi-Fi hotspot is determined as the target 5G Wi-Fi hotspot. If a plurality of 5G Wi-Fi hotspots are selected, Rule 3 may be executed.

Rule 3: If there are one or more 5G Wi-Fi hotspots around the receiver device, or if the receiver device selects a plurality of 5G Wi-Fi hotspots based on Rule 2, for the plurality of selected 5G Wi-Fi hotspots, the receiver device may select a 5G Wi-Fi hotspot with a highest protocol standard as the target 5G Wi-Fi hotspot in descending order of protocol standards of the 5G Wi-Fi hotspots. For example, a 5G Wi-Fi hotspot with a Wi-Fi 6+ standard is preferentially selected as the target 5G Wi-Fi hotspot. If there is no 5G Wi-Fi hotspot with the Wi-Fi 6+ standard, a 5G Wi-Fi hotspot with a Wi-Fi 6 standard is preferentially selected as the target 5G Wi-Fi hotspot. If there is no 5G Wi-Fi hotspot with the Wi-Fi 6 standard, a 5G Wi-Fi hotspot with a Wi-Fi 5 standard is preferentially selected as the target 5G Wi-Fi hotspot.

It should be supplemented herein that, to select the target 5G Wi-Fi hotspot, the receiver device may use any one of the foregoing rules alone or a combination of the foregoing plurality of rules, for example, use the plurality of rules based on a particular priority, or use the plurality of rules with a same priority. This is not limited in this embodiment of this application.

Step S703: The receiver device determines whether a condition for connecting to the target 5G Wi-Fi hotspot is met. If the condition for connecting to the target 5G Wi-Fi hotspot is met, step S704 is performed. If the condition for connecting to the target 5G Wi-Fi hotspot is not met, the receiver device performs the network multiplex procedure.

In an implementation, the condition that is for connecting to the target 5G Wi-Fi hotspot and that the receiver device needs to meet may include any one of the following:

Condition 1: If a score score_5G of the target 5G Wi-Fi hotspot is greater than or equal to a preset second threshold, and an RSSI value of the target 5G Wi-Fi hotspot is greater than or equal to a preset third threshold, the condition for connecting to the target 5G Wi-Fi hotspot is met.

The receiver device may introduce a Wi-Fi scoring mechanism to generate a score for a Wi-Fi hotspot according to some rules. The score for the Wi-Fi hotspot may be denoted in units of dBm. A higher score indicates a higher value. The rules that may be used herein include, but are not limited to:

determining whether the Wi-Fi hotspot is a 5G Wi-Fi hotspot, where if the Wi-Fi hotspot is the 5G Wi-Fi hotspot, the score is higher;

obtaining a historical signal strength of the Wi-Fi hotspot, for example, an RSSI value, where a higher RSSI value indicates a higher score;

whether the receiver device is previously connected to the Wi-Fi hotspot, where if the receiver device is previously connected to the Wi-Fi hotspot, the score is higher, and a larger quantity of times of success of historical connections indicates a higher score;

obtaining a historical transmission rate of the Wi-Fi hotspot, where a higher historical transmission rate indicates a higher score;

obtaining a quantity of times of historical freeze of the Wi-Fi hotspot, where a smaller quantity of times of freeze indicates a higher score;

determining whether the Wi-Fi hotspot supports roaming, where if the Wi-Fi hotspot supports roaming, the score is higher; and determining whether the Wi-Fi hotspot is an open network, where if the Wi-Fi hotspot is not an open network, the score is higher.

For example, the second threshold may be 40 dBm, and the third threshold may be −70 dBm. Then, the condition that is for connecting to the target 5G Wi-Fi hotspot and that the receiver device needs to meet is: score_5G≥40 dBm&&RSSI≥−70 dBm.

Condition 2: If the score score_5G of the target 5G Wi-Fi hotspot is greater than a sum of a score score_2.4G of the 2.4G Wi-Fi hotspot to which the receiver device is currently connected and a preset compensation value, and the RSSI value of the target 5G Wi-Fi hotspot is greater than or equal to a fourth preset threshold, the condition for connecting to the target 5G Wi-Fi hotspot is met.

For example, the compensation value may be 5 dBm, and the fourth threshold may be −70 dBm. Then, the condition that is for connecting to the target 5G Wi-Fi hotspot and that the receiver device needs to meet is: score_5G>score_2G+5 dBm &&RSSI≥−70 dBm.

Condition 3: If the target 5G Wi-Fi hotspot and the 2.4G Wi-Fi hotspot to which the receiver device is currently connected belong to a same AP, and specific bits in a MAC address are the same, for example, MAC 3 to 13 are the same, and the RSSI value of the target 5G Wi-Fi hotspot is greater than or equal to a fourth preset threshold, the condition for connecting to the target 5G Wi-Fi hotspot is met. For example, the fourth threshold may be −65 dBm.

In addition, if the receiver device cannot select, based on the foregoing conditions, the target 5G Wi-Fi hotspot meeting the connection condition, the receiver device may select a 5G Wi-Fi hotspot with a signal strength of two or more bars from the surrounding 5G Wi-Fi hotspots as the to-be-connected target 5G Wi-Fi hotspot.

Step S704: The receiver device is connected to the target 5G Wi-Fi hotspot.

After the receiver is connected to the target 5G Wi-Fi hotspot, the network preferential selection procedure ends. Next, the receiver device may further perform the following step, to disconnect the BLE connection from the receiver device.

Step S705: The receiver device sends a second indication message to the transmitter device by using the BLE connection, where the indication message is used for the receiver device to indicate to the transmitter device that the receiver device has connected to the target 5G Wi-Fi hotspot.

Step S705 may be performed before step S704, may be performed simultaneously with step S704, or may be performed after step S704. This is not limited in this embodiment of this application.

In an implementation, the second indication message may include status information of the receiver device, for example: The receiver device has performed the Wi-Fi P2P connection preferential selection procedure and is connected to the target 5G Wi-Fi hotspot.

In an implementation, the second indication message may also include a MAC address of the receiver device, status information of the receiver device, Wi-Fi protocols (such as 2.4G Wi-Fi and/or 5G Wi-Fi) supported by the receiver device, and the like.

Step S507: The transmitter device disconnects the BLE connection from the receiver device.

In a specific implementation, after receiving the second indication message, the transmitter device may learn from the status information in the second indication message that the receiver device has executed the network preferential selection procedure and is connected to the target 5G Wi-Fi hotspot, and meets a condition for establishing a Wi-Fi P2P connection with the transmitter device in the 5 GHz frequency band. Therefore, the BLE connection with the receiver device is disconnected, and step S508 is performed.

Step S508: The transmitter device establishes the Wi-Fi P2P connection with the receiver device in the 5 GHz frequency band.

It may be understood that, because the receiver device has performed the network preferential selection procedure and is connected to the 5G Wi-Fi hotspot, the transmitter device may establish the Wi-Fi P2P connection with the receiver device in the 5 GHz frequency band provided that the transmitter device is also connected to the 5G Wi-Fi hotspot.

After establishing the Wi-Fi P2P connection with the receiver device, the transmitter device may send a file transmission request to the receiver device. The file transmission request may include, for example, one or more types of information such as a name, a type, a size, a quantity, and detailed information of a to-be-transmitted file. This is not limited in this embodiment of this application. For example, when the to-be-transmitted file is a photo, the file transmission request may include a thumbnail, a size, and the like of the photo; or when the to-be-transmitted file is a document, the file transmission request may include a name, an icon, a format, and the like of the document.

It should be supplemented that, if the transmitter device is initially connected to the 2.4G Wi-Fi hotspot when the user shares the file, the transmitter device may also switch from the 2.4G Wi-Fi hotspot to the 5G Wi-Fi hotspot by using the network preferential selection procedure. For example, the transmitter device may perform the network preferential selection procedure in step S301, that is, when sending the first broadcast message, or perform the network preferential selection procedure in any time period between steps S501 and S506. This is not limited in this application. For a specific manner in which the transmitter device performs the network preferential selection procedure, refer to the implementation of the receiver device. Details are not described herein again.

Step S509: The receiver device confirms to receive the file in response to a third operation of the user.

The third operation may be one or more touch operations performed by the user on the receiver device.

For example, the third operation may include an operation of tapping a receive button on the receiver device by the user.

Figure 8:
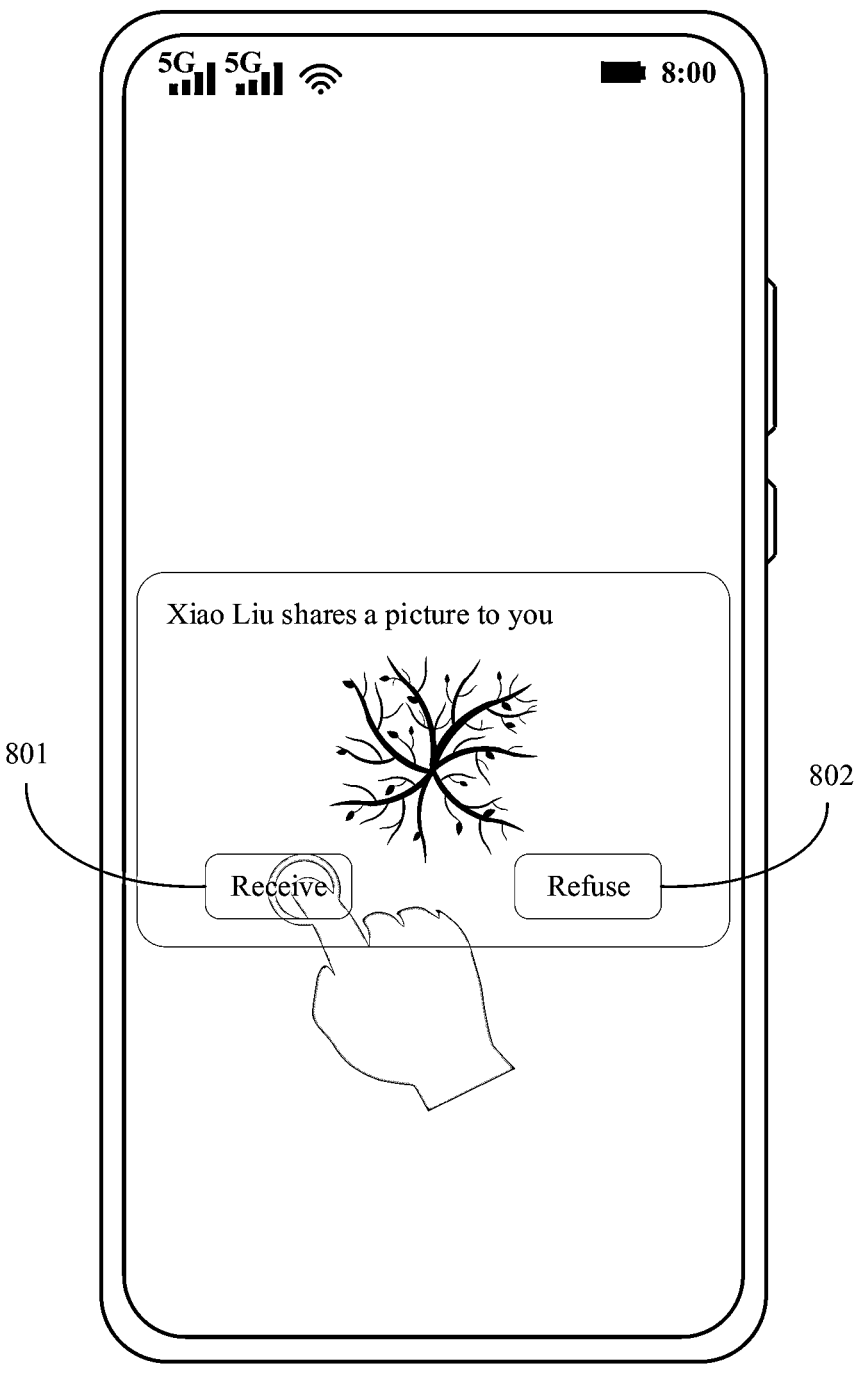
FIG. 8 is a schematic diagram showing that a user taps a receive button according to an embodiment of this application.

By using an example in which the user shares photos in the album application, with reference to FIG. 8, after receiving a picture transmission request from the transmitter device, the receiver device may display a dialog box in a display screen to guide the user to confirm or refuse to receive the photos. The dialog box may include, for example, information such as thumbnails and a quantity of photos received from the transmitter device, a receive button 801, a refuse button 802, and the like. When detecting that the user taps the receive button 801 in the dialog box, the receiver device initiates a P2P file transmission procedure with the transmitter device in response to the tap operation of the user, and starts to receive photos from the transmitter device, that is, triggers step S510.

For example, when a plurality of photos are transmitted, the transmitter device may display information such as a quantity of sent photos, a quantity of to-be-sent photos, and a transmission speed; and the receiver device may display information such as a quantity of received photos, a quantity of to-be-received photos, and a transmission speed.

In another implementation, the third operation may include a voice input operation performed by the user on the receiver device.

By using an example in which the user shares photos in the album application, after the receiver device displays a dialog box in the display screen to guide the user to confirm or refuse to receive photos, the user may directly say a token indicating "receive" or "reject" to the receiver device, such as "receive photos", to confirm to receive a file from the transmitter device.

Step S510: The receiver device receives the file transmitted by the transmitter device by using the Wi-Fi P2P connection.

In the photo transmission process, the receiver device and the transmitter device may display information such as a transmission progress and a transmission speed of the photos to the user in real time.

Step S511: The transmitter device may disconnect the P2P and BLE connections from the receiver after file transmission ends.

After file transmission is completed, the receiver device may disconnect the Wi-Fi P2P and BLE connections from the transmitter device and restore to a state before file sharing.

Step S512: The transmitter device and the receiver device send and scan BLE broadcast.

Step S513: The transmitter device refreshes a receiver device list.

For a time period thereafter, the transmitter device and the receiver device may continue to send and scan BLE broadcast. The transmitter device may refresh the receiver device list based on a scan result of BLE broadcast, to facilitate continuing to send files to other devices subsequently.

According to the file sharing method provided in this embodiment of this application, after receiving the file sharing request from the transmitter device, the receiver device connected to the 2.4G Wi-Fi hotspot establishes the Wi-Fi P2P connection with the transmitter device in the 5 GHz frequency band, so that files are transmitted between the receiver device and the transmitter device by using the Wi-Fi P2P connection in the 5 GHz frequency band, to improve a file transmission speed and reduce a file transmission time, thereby improving use experience of the user.

Figure 9:
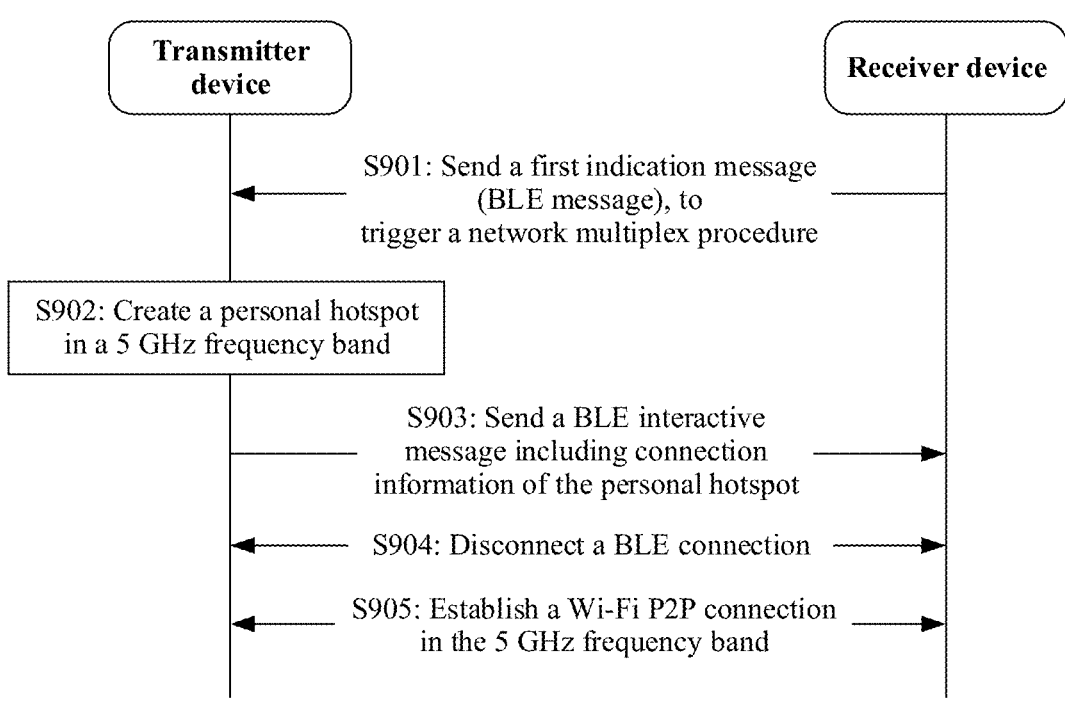
FIG. 9 is a schematic diagram of a network multiplex procedure according to an embodiment of this application.

FIG. 9 is a schematic diagram of a network multiplex procedure according to an embodiment of this application. With reference to FIG. 9, in an implementation, the network multiplex procedure of a receiver device and a transmitter device may be implemented by using the following steps.

Step S901: The receiver device sends a first indication message to the transmitter device by using a BLE connection, where the first indication message is used to indicate the transmitter device to perform a network multiplex procedure, for example, create a personal hotspot in a 5 GHz frequency band, such as a P2P GO (Group Owner).

In a specific implementation, the receiver device may notify, by using the first indication message, the transmitter device of a state that there is no 5G Wi-Fi around the receiver device or that a condition for connecting to a 5G Wi-Fi hotspot is not met. In this way, the transmitter device may determine that the receiver device cannot perform a 5G preferential selection procedure, and therefore starts to perform the network multiplex procedure.

In an implementation, the receiver device may also add a MAC address of the receiver device, status information of the receiver device, Wi-Fi protocols (such as 2.4G Wi-Fi and/or 5G Wi-Fi) supported by the receiver device, and the like to the first indication message, so that the receiver device can be successfully connected, as an STA device (for example, a P2P GC (Group client)) of a Wi-Fi P2P connection, to the personal hotspot (for example, the P2P GO) created by the transmitter device.

Step S902: The transmitter device creates a personal hotspot in the 5 GHz frequency band in response to the first indication message.

In a specific implementation, because the transmitter device has started the network preferential selection procedure, the transmitter device creates a personal hotspot in the 5 GHz frequency band, such as the P2P GO, provided that the transmitter device confirms that the receiver device supports 5G Wi-Fi, so that the receiver device subsequently establishes the Wi-Fi P2P connection in the 5 GHz frequency band with the transmitter device.

Step S903: The transmitter device sends a BLE interactive message to the receiver device, where the BLE interactive message includes connection information of the personal hotspot.

In a specific implementation, by using the P2P GO as an example, the connection information may include a service set identifier (service set identifier, SSID), a base service set identifier (base service set identifier, BSSID), a key, an IP address, and other information of the P2P GO, so that the receiver device can recognize the P2P GO based on the connection information and connect to the P2P GO.

Step S904: The transmitter device disconnects the BLE connection from the receiver device.

After sending a fourth BLE message to the receiver device, the transmitter device may disconnect the BLE connection from the receiver device, to complete BLE connection based P2P information exchange with the receiver device, and waits for the receiver device to subsequently access the P2P GO as the P2P GC.

Step S905: The receiver device establishes the Wi-Fi P2P connection in the 5 GHz frequency band with the transmitter device as the STA device based on the connection information of the personal hotspot.

After the receiver device establishes the Wi-Fi P2P connection in the 5 GHz frequency band with the transmitter, the network multiplex procedure of the receiver device and the transmitter device is completed. The transmitter device and the receiver device may transmit files based on the Wi-Fi P2P connection in the 5 GHz frequency band, to achieve a higher transmission speed and reduce a file transmission time.

Figure 10:
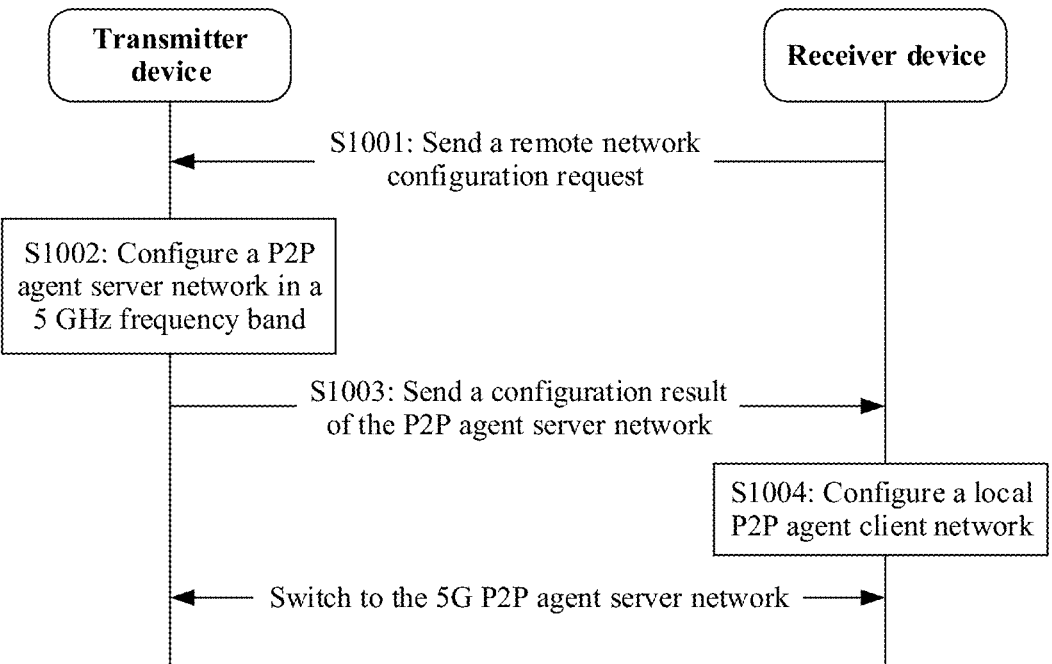
FIG. 10 is a schematic diagram of another network multiplex procedure according to an embodiment of this application.

FIG. 10 is a schematic diagram of another network multiplex procedure according to an embodiment of this application. Either of the network multiplex procedure and the network multiplex procedure that is shown in FIG. 9 may be used, or the network multiplex procedure is used when at least one of the receiver device and/or the transmitter device do not support creating a personal hotspot. As shown in FIG. 10, in another implementation, the network multiplex procedure of the receiver device and the transmitter device may be implemented by using the following steps.

Step S1001: The receiver device sends a remote network configuration request for a P2P agent service to the transmitter device.

The receiver device may send the remote network configuration request to the transmitter device by using a BLE message.

Step S1002: The transmitter device configures a P2P agent server network in a 5 GHz frequency band in response to the remote network configuration request.

Step S1003: The transmitter device transmits a configuration result of the P2P agent server network to the receiver device.

The transmitter device may send the configuration result of the P2P agent server network to the receiver device by using a BLE message.

After sending the configuration result of the P2P agent server network to the receiver device, the transmitter device may disconnect the BLE connection from the transmitter device, and wait for the receiver device to switch from a 2.4G Wi-Fi network to which the receiver device is connected to the 5G P2P agent server network configured by the transmitter device.

Step S1004: The receiver device configures a local P2P agent client network based on the configuration result of the P2P agent server network, and switches from the 2.4G Wi-Fi network to which the receiver device is connected to the 5G P2P agent server network configured by the transmitter device.

After the receiver device switches from the 2.4G Wi-Fi network to which the receiver device is connected to the 5G P2P agent server network configured by the transmitter device, the network multiplex procedure of the receiver device and the transmitter device is completed. The transmitter device and the receiver device may transmit files based on the 5G Wi-Fi P2P agent service, to achieve a higher transmission speed and reduce a file transmission time.

Figure 11A:
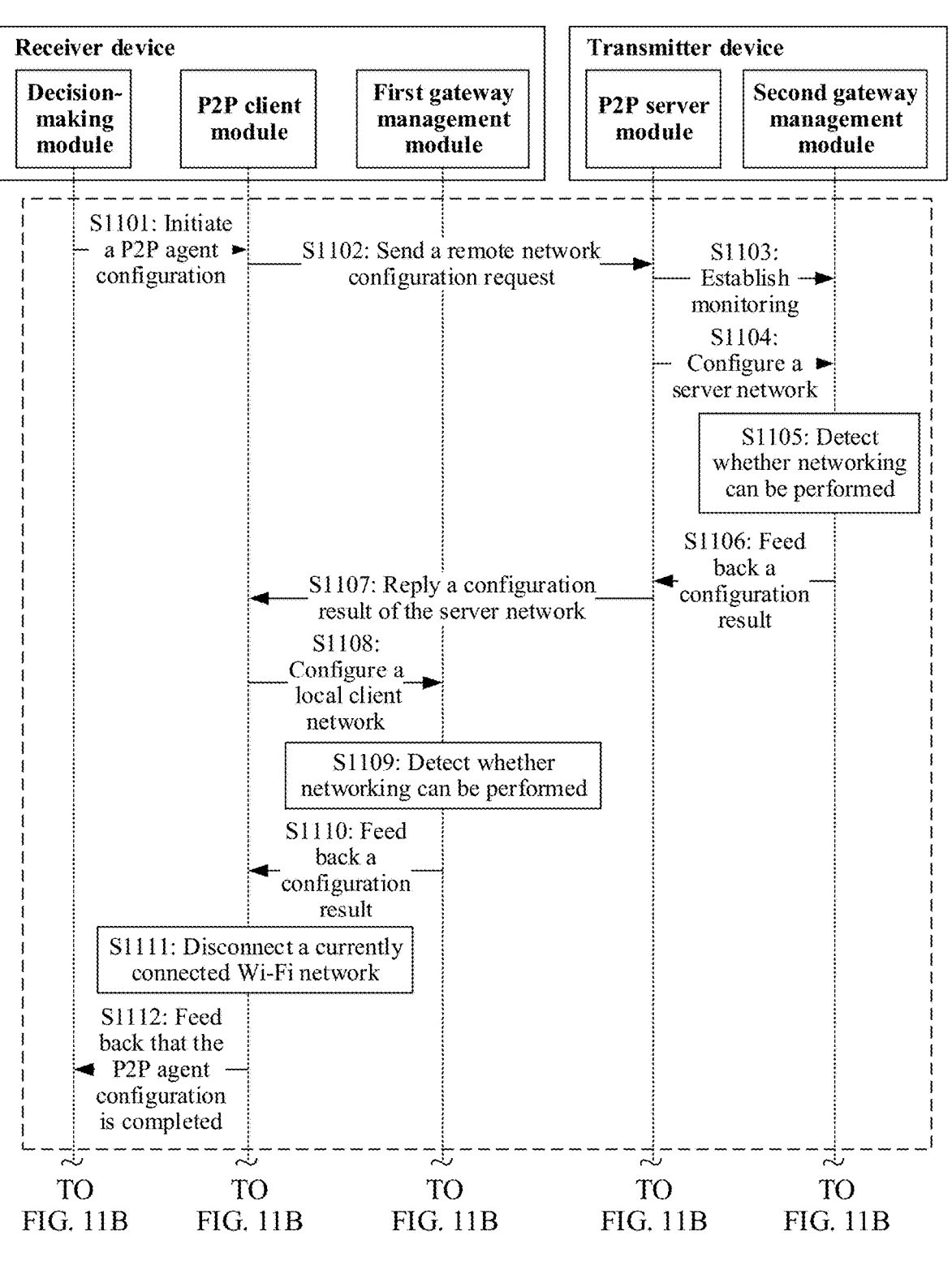
FIG. 11A and FIG. 11B are a schematic diagram of inter-process interaction when a receiver device establishes a P2P agent service with a transmitter device.
Figure 11B:
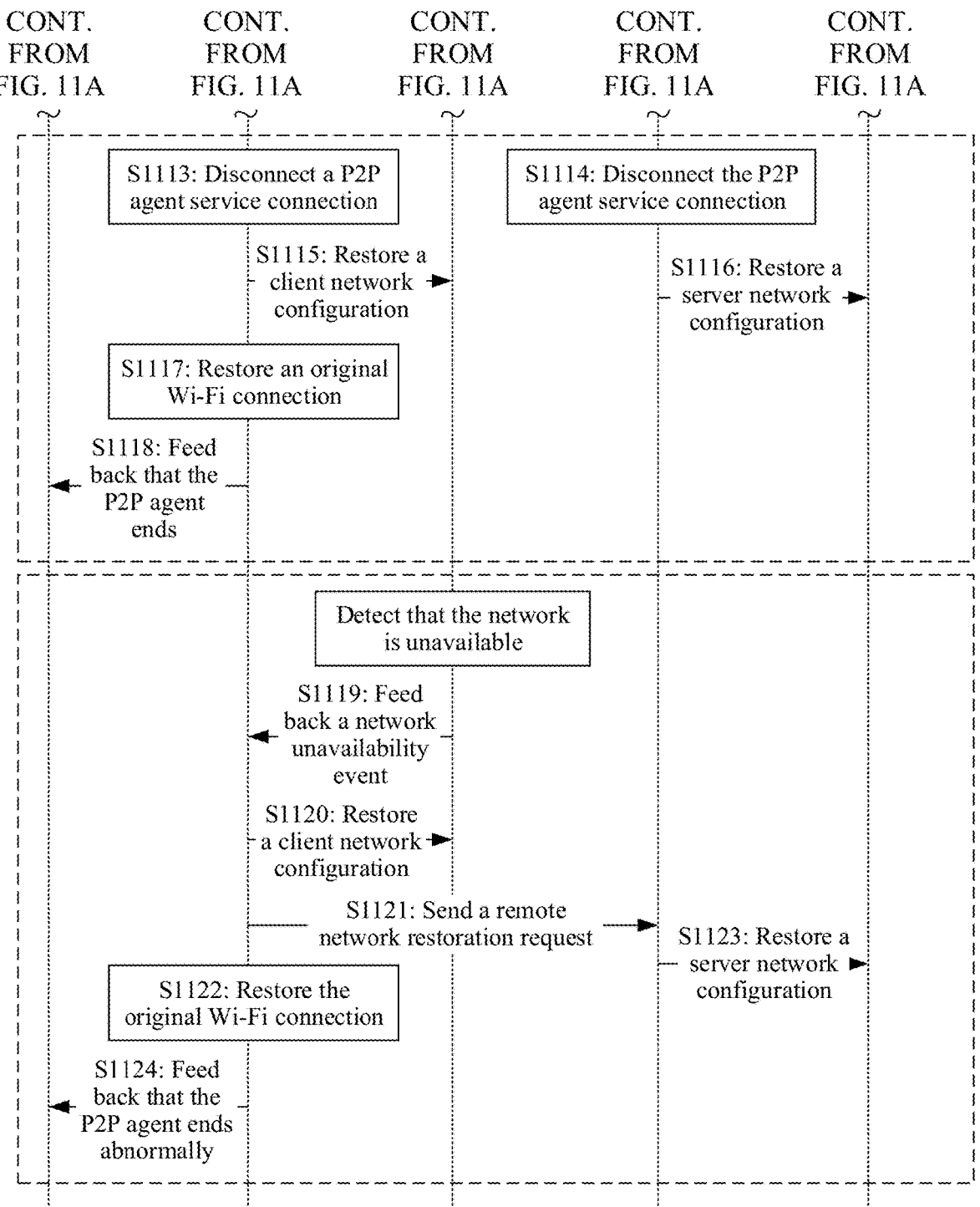

FIG. 11A and FIG. 11B are a schematic diagram of inter-process interaction when a receiver device establishes a P2P agent service with a transmitter device.

As shown in FIG. 11A, in an implementation, establishing a P2P agent service between the receiver device and the transmitter device may be implemented by a decision-making module, a P2P client module, and a first gateway management module of the receiver device, and a P2P server module and a second gateway management module of the transmitter device, and may specifically include the following steps S1101 to S1112:

Step S1101: The decision-making module of the receiver device initiates a P2P agent configuration to the P2P client module.

Step S1102: The P2P client module sends a remote network configuration request to the P2P server module.

Step S1103: The P2P server module receives the remote network configuration request and establishes monitoring for the second gateway management module.

Step S1104: The P2P server module invokes the second gateway management module to configure a server network.

Step S1105: After configuring the server network, the module of the transmitter device detects whether networking can be performed.

Step S1106: The module of the transmitter device feeds back a configuration result of the server network to the P2P server module.

Step S1107: After monitoring the configuration result that is of the server network and that is fed back by the second gateway management module, the P2P server module replies the configuration result of the server network to the P2P client module.

Step S1108: The P2P client module invokes the first gateway management module to configure a local client network based on the configuration result of the server network, to switch the receiver device from a 2.4G Wi-Fi network to which the receiver device is connected to the 5G P2P agent server network configured by the transmitter device.

Step S1109: After configuring the client network, the first gateway management module detects whether networking can be performed.

Step S1110: If networking can be performed, the first gateway management module feeds back the configuration results of the client network to the P2P client module.

Step S1111: When determining, based on the configuration result of the client network, that networking can be performed, the P2P client module disconnects the currently connected Wi-Fi network.

Step S1112: The P2P client module feeds back a message that the P2P agent configuration is completed to the decision-making module.

In this way, establishment of the 5G P2P agent service between the receiver device and the transmitter device is completed. Next, the transmitter device may transmit files to the receiver device based on the 5G P2P agent service, to achieve a higher transmission speed and reduce a file transmission time.

Further, as shown in FIG. 11B, the decision-making module, the P2P client module, and the first gateway management module of the receiver device, and the P2P server module and the second gateway management module of the transmitter device are also configured to implement a procedure of disconnecting the P2P agent service. This may specifically include the following steps S1113 to S1118:

Step S1113: The P2P client module disconnects a P2P agent service connection.

Step S1114: The P2P server module disconnects the P2P agent service connection.

Step S1115: The P2P client module invokes the first gateway management module to restore a client network configuration.

Step S1116: The P2P server module invokes the second gateway management module to restore a server network configuration.

Step S1117: The P2P client restores an original Wi-Fi connection of the receiver device.

Step S1118: The P2P client module feeds back a P2P agent end message to the decision-making module.

In this way, the 5G P2P agent service connection between the receiver device and the transmitter device is disconnected, and the receiver device and the transmitter device respectively restore network configurations of the receiver device and the transmitter device to states before the 5G P2P agent service is established. The receiver device and the transmitter device may continue to perform network activities before file transmission.

Further, as shown in FIG. 11B, in an implementation, when the first gateway management module configures the client network and then detects that networking cannot be performed, that is, when the network is unavailable, the decision-making module, the P2P client module, and the gateway management service module of the receiver device, and the P2P server module and the second gateway management module of the transmitter device are also configured to implement a procedure of ending the P2P agent service. This may specifically include the following steps S1119 to S1124:

Step S1119: If detecting that the network is unavailable, the first gateway management module feeds back a network unavailability event to the P2P client module.

Step S1120: The P2P client module invokes the first gateway management module to restore the client network configuration.

Step S1121: The P2P client module sends a remote network restoration request to the P2P server module.

Step S1122: The P2P client restores the original Wi-Fi connection of the receiver device.

Step S1123: In response to the remote network restoration request, the P2P server module invokes the second gateway management module to restore the server network configuration.

Step S1124: The P2P client module feeds back a message that the P2P agent ends abnormally to the decision-making module.

In this way, when discovering that the 5G P2P agent service is unavailable, the receiver device promptly disconnects the 5G P2P agent service connection from the transmitter device, restores the network configuration of the receiver device to the state before the 5G P2P agent service is established, and also notifies the transmitter device to restore the network configuration of the transmitter device to the state before the 5G P2P agent service is established, so that the receiver device and the transmitter device may continue to perform network activities before file transmission, and avoid a case in which the network cannot be used due to staying in the connected state of the P2P agent service.

In the foregoing embodiments provided in this application, the solutions of the file sharing method provided in this application are described from perspectives of the terminal device itself and interaction between terminal devices. It may be understood that, to implement the foregoing functions, the terminal device (for example, the transmitter device or the receiver device) includes corresponding hardware structures and/or software modules for executing various functions. A person skilled in the art should be easily aware that, units, algorithms, and steps in the examples described with reference to the embodiments disclosed in this specification can be implemented in a form of hardware or a combination of hardware and computer software in this application. Whether a function is performed by hardware or computer software driving hardware depends on particular applications and design constraints of the technical solutions. A person skilled in the art may implement the described functions by using different methods for each specific application, but it should not be considered that this implementation goes beyond the scope of this application.

Figure 12:
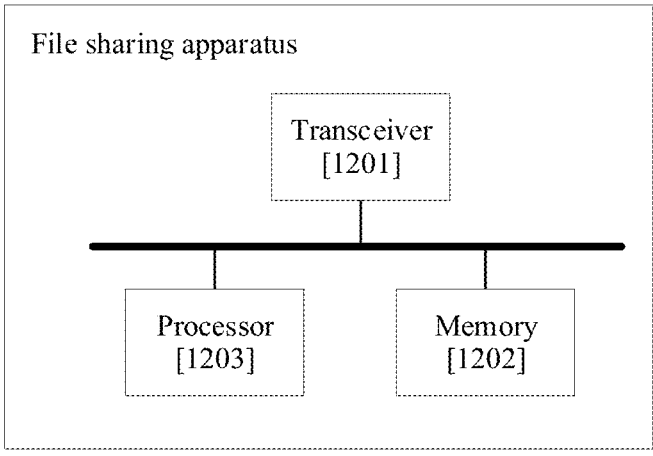
FIG. 12 is a schematic diagram of a structure of a file sharing apparatus according to an embodiment of this application.

FIG. 12 is a schematic diagram of a structure of a file sharing apparatus according to an embodiment of this application. As shown in FIG. 12, the file sharing apparatus may include a transceiver 1201, a memory 1202, and a processor 1203.

In some embodiments, the processor 1203 may include one or more processing units. For example, the processor 1203 may include an application processor, a modem processor, a graphics processing unit, an image signal processor, a controller, a video codec, a digital signal processor, a baseband processor, and/or a neural-network processing unit. The different processing units may be independent devices, or may be integrated into one or more processors. The memory 1202 is coupled to the processor 1203, and is configured to store various software programs and/or a plurality of groups of instructions. In some embodiments, the memory 1202 may include a volatile memory and/or a non-volatile memory. The transceiver 1201 may include, for example, a radio frequency circuit, a mobile communication module, a wireless communication module, a Bluetooth communication module, and the like, for implementing a wireless communication function of a receiver device or a transmitter device.

In some embodiments, the file sharing apparatus shown in FIG. 12 may be used to implement the function of the receiver device.

In an embodiment, when the software programs and/or the plurality of groups of instructions in the memory 1202 are run by the processor 1203, the receiver device is enabled to perform the following method steps: receiving a first broadcast message sent by a transmitter device, where the first broadcast message includes a file sharing request; sending a second broadcast message to the transmitter device in response to the first broadcast message, where the second broadcast message includes receiver device information; receiving a P2P connection request of the transmitter device, where the P2P connection request is generated by the transmitter device based on the receiver device information; if the receiver device is currently connected to a 2.4 GHz Wi-Fi network and does not support dual band dual concurrent DBDC, starting a network preferential selection procedure in response to the P2P connection request, where the network preferential selection procedure is used for the receiver device to switch from the 2.4 GHz Wi-Fi network to a Wi-Fi network in a target frequency band, where the target frequency band includes frequency bands of 5 GHz and above; establishing a Wi-Fi P2P connection in the target frequency band with the transmitter device; and receiving a file sent by the transmitter device by using the Wi-Fi P2P connection. In this way, the transmitter device establishes the Wi-Fi P2P connection in a frequency band of 5 GHz or above with the receiver device, to prevent another wireless signal in a frequency band of less than 5 GHz from causing interference to the Wi-Fi P2P connection between the transmitter device and the receiver device, so as to help improve a speed of file transmission between the transmitter device and the receiver device, improve stability of the Wi-Fi P2P connection between the transmitter device and the receiver device, and shorten a file transmission time, thereby improving use experience of sharing, by a user, a file between two terminal devices.

In an embodiment, when the software programs and/or the plurality of groups of instructions in the memory 1202 are run by the processor 1203, the receiver device is specifically enabled to perform the following method steps: determining whether the receiver device is currently connected to a Wi-Fi hotspot in the target frequency band; if the receiver device is not currently connected to the Wi-Fi hotspot in the target frequency band, selecting a target hotspot from surrounding Wi-Fi hotspots in the target frequency band based on a signal strength and/or a protocol standard of the Wi-Fi hotspot; if the target hotspot is selected, determining whether a condition for connecting to the target hotspot is met; and if the condition for connecting to the target hotspot is met, connecting to the target hotspot. In this way, after receiving the file sharing request of the transmitter device, if a target hotspot meeting the connection condition exists, the receiver device is connected to the target hotspot, so that the receiver device can establish the Wi-Fi P2P connection in the target frequency band with the transmitter device, to improve a file transmission speed.

In an embodiment, when the software programs and/or the plurality of groups of instructions in the memory 1202 are run by the processor 1203, the receiver device is specifically enabled to perform the following method steps: selecting, from the Wi-Fi hotspots in the target frequency band, a Wi-Fi hotspot that belongs to a same access point device as a Wi-Fi hotspot to which the receiver device is currently connected and that has a received signal strength indicator RSSI value greater than a first preset threshold as the target hotspot; and/or selecting, from the Wi-Fi hotspots in the target frequency band, a Wi-Fi hotspot that has a largest quantity of signal bars as the target hotspot; and/or selecting, from the Wi-Fi hotspots in the target frequency band, a Wi-Fi hotspot that has a highest protocol standard as the target hotspot. In this way, the receiver device may select, based on the signal strength and/or the network standard, a high-quality Wi-Fi hotspot as the target hotspot.

In an embodiment, when the software programs and/or the plurality of groups of instructions in the memory 1202 are run by the processor 1203, the receiver device is specifically enabled to perform the following method steps: determining, based on a score and/or a signal strength of the target hotspot, whether the condition for connecting to the target hotspot is met, where the score of the target hotspot is determined based on at least one or more of the following information: a quantity of times of success of historical connections between the receiver device and the target hotspot, a historical transmission rate, a historical signal strength, and a quantity of times of historical freeze.

In an embodiment, meeting the condition for connecting to the target hotspot includes any one of the following: the score of the target hotspot is greater than or equal to a second preset threshold, and an RSSI value of the target hotspot is greater than or equal to a third preset threshold; the score of the target hotspot is greater than a sum of a score of a Wi-Fi hotspot to which the receiver device is currently connected and a preset compensation value, and the RSSI value of the target hotspot is greater than or equal to a fourth preset threshold; and the target hotspot and the Wi-Fi hotspot to which the receiver device is currently connected belong to a same access point device, and specific bits in a media access control address MAC address are the same, and the RSSI value of the target hotspot is greater than or equal to a fifth preset threshold. In this way, the receiver device may determine, based on the RSSI and the score of the target hotspot, whether the condition for connecting to the target hotspot is met, to ensure that the connected target hotspot can improve a subsequent file transmission speed.

In an embodiment, when the software programs and/or the plurality of groups of instructions in the memory 1202 are run by the processor 1203, the receiver device is further enabled to perform the following method step: ending the network preferential selection procedure if the receiver device is currently connected to the Wi-Fi hotspot in the target frequency band.

In an embodiment, when the software programs and/or the plurality of groups of instructions in the memory 1202 are run by the processor 1203, the receiver device is further enabled to perform the following method step: if the target hotspot is not selected, or if the condition for connecting to the target hotspot is not met, starting a network multiplex procedure.

In an embodiment, when the software programs and/or the plurality of groups of instructions in the memory 1202 are run by the processor 1203, the receiver device is further enabled to perform the following method steps: sending a first indication message to the transmitter device, where the first indication message is used to indicate the transmitter device to create a personal hotspot in the target frequency band; receiving connection information of the personal hotspot from the transmitter device; and connecting to the personal hotspot based on the connection information. In this way, when the receiver device does not meet the condition for connecting to the target hotspot, the transmitter device may create the personal hotspot in the target frequency band, so that the receiver device establishes the P2P connection on the personal hotspot created by the transmitter device.

In an embodiment, when the software programs and/or the plurality of groups of instructions in the memory 1202 are run by the processor 1203, the receiver device is further enabled to perform the following method steps: sending a remote network configuration request to the transmitter device, where the remote network configuration request is used to indicate the transmitter device to configure a P2P agent server network in the target frequency band; receiving a configuration result of the P2P agent server network from the transmitter device; and configuring a local P2P agent client network based on the configuration result, to switch from the 2.4 GHz Wi-Fi network to the P2P agent server network. In this way, when the receiver device does not meet the condition for connecting to the target hotspot, the transmitter device may create the P2P agent server network in the target frequency band, so that the receiver device is connected to the P2P agent server network created by the transmitter device.

In an embodiment, the first broadcast message and the second broadcast message are Bluetooth low energy BLE broadcast messages, and the P2P connection request is sent by the transmitter device by using a BLE connection; and when the software programs and/or the plurality of groups of instructions in the memory 1202 are run by the processor 1203, the receiver device is further enabled to perform the following method step: before receiving the P2P connection request from the transmitter device, establishing the BLE connection with the transmitter device.

In an embodiment, when the software programs and/or the plurality of groups of instructions in the memory 1202 are run by the processor 1203, the receiver device is further enabled to perform the following method step: before establishing the Wi-Fi P2P connection in the target frequency band with the transmitter device, disconnecting the BLE connection from the transmitter device.

In some other embodiments, the file sharing apparatus shown in FIG. 12 may be used to implement the function of the transmitter device.

In an embodiment, when the software programs and/or the plurality of groups of instructions in the memory 1202 are run by the processor 1203, the transmitter device is enabled to perform the following method steps: sending a first broadcast message to a receiver device, where the first broadcast message includes a file sharing request; receiving a second broadcast message from the receiver device, where the second broadcast message is sent by the receiver device in response to the first broadcast message, and the second broadcast message includes receiver device information; sending a P2P connection request to the receiver device based on the receiver device information, where if the receiver device is currently connected to a 2.4 GHz Wi-Fi network and does not support DBDC, the receiver device starts a network preferential selection procedure in response to the P2P connection request, where the network preferential selection procedure is used for the receiver device to switch from the 2.4 GHz Wi-Fi network to a Wi-Fi network in a target frequency band, where the target frequency band includes frequency bands of 5 GHz and above; establishing a Wi-Fi P2P connection in the target frequency band with the receiver device; and sending a file to the receiver device by using the Wi-Fi P2P connection. In this way, the transmitter device establishes the Wi-Fi P2P connection in a frequency band of 5 GHz or above with the receiver device, to prevent another wireless signal in a frequency band of less than 5 GHz from causing interference to the Wi-Fi P2P connection between the transmitter device and the receiver device, so as to help improve a speed of file transmission between the transmitter device and the receiver device, improve stability of the Wi-Fi P2P connection between the transmitter device and the receiver device, and shorten a file transmission time, thereby improving use experience of sharing, by a user, a file between two terminal devices.

In an embodiment, when the software programs and/or the plurality of groups of instructions in the memory 1202 are run by the processor 1203, the transmitter device is further specifically enabled to perform the following method steps: before sending the first broadcast message to the receiver device, where the first broadcast message includes the file sharing request, if the transmitter device is currently connected to a 2.4 GHz Wi-Fi network and does not support DBDC, starting the network preferential selection procedure, where the network preferential selection procedure is used for the transmitter device to switch from the 2.4 GHz Wi-Fi network to a Wi-Fi network in the target frequency band, where the target frequency band includes frequency bands of 5 GHz and above. In this way, when the transmitter device is currently connected to the 2.4 GHz Wi-Fi network and does not support DBDC, the transmitter device may also establish the Wi-Fi P2P connection in a frequency band of 5 GHz or above with the receiver device.

In an embodiment, when the software programs and/or the plurality of groups of instructions in the memory 1202 are run by the processor 1203, the transmitter device is further enabled to perform the following method steps: determining whether the transmitter device is currently connected to a Wi-Fi hotspot in the target frequency band; if the transmitter device is not currently connected to the Wi-Fi hotspot in the target frequency band, selecting a target hotspot from surrounding Wi-Fi hotspots in the target frequency band based on a signal strength and/or a protocol standard of the Wi-Fi hotspot; if the target hotspot is selected, determining whether a condition for connecting to the target hotspot is met; and if the condition for connecting to the target hotspot is met, connecting to the target hotspot. In this way, if the transmitter has a target hotspot meeting the connection condition, the transmitter device is connected to the target hotspot, so that the transmitter device can establish the Wi-Fi P2P connection in the target frequency band with the receiver device, to improve a file transmission speed.

In an embodiment, when the software programs and/or the plurality of groups of instructions in the memory 1202 are run by the processor 1203, the transmitter device is specifically enabled to perform the following method steps: selecting, from the Wi-Fi hotspots in the target frequency band, a Wi-Fi hotspot that belongs to a same access point device as a Wi-Fi hotspot to which the transmitter device is currently connected and that has an RSSI value greater than a first threshold as the target hotspot; and/or selecting, from the Wi-Fi hotspots in the target frequency band, a Wi-Fi hotspot that has a largest quantity of signal bars as the target hotspot; and/or selecting, from the Wi-Fi hotspots in the target frequency band, a Wi-Fi hotspot that has a highest protocol standard as the target hotspot. In this way, the transmitter device may select, based on the signal strength and/or the network standard, a high-quality Wi-Fi hotspot as the target hotspot.

In an embodiment, when the software programs and/or the plurality of groups of instructions in the memory 1202 are run by the processor 1203, the transmitter device is specifically enabled to perform the following method steps: determining, based on a score and/or a signal strength of the target hotspot, whether the condition for connecting to the target hotspot is met, where the score of the target hotspot is determined based on at least one or more of the following information: a quantity of times of success of historical connections between the transmitter device and the target hotspot, a historical transmission rate, a historical signal strength, and a quantity of times of historical freeze.

In an embodiment, meeting the condition for connecting to the target hotspot includes any one of the following: the score of the target hotspot is greater than or equal to a second preset threshold, and an RSSI value of the target hotspot is greater than or equal to a third preset threshold; the score of the target hotspot is greater than a sum of a score of a Wi-Fi hotspot to which the transmitter device is currently connected and a preset compensation value, and the RSSI value of the target hotspot is greater than or equal to a fourth preset threshold; and the target hotspot and the Wi-Fi hotspot to which the transmitter device is currently connected belong to a same access point device, and specific bits in a MAC address are the same, and the RSSI value of the target hotspot is greater than or equal to a fifth preset threshold. In this way, the transmitter device may determine, based on the RSSI and the score of the target hotspot, whether the condition for connecting to the target hotspot is met, to ensure that the connected target hotspot can improve a subsequent file transmission speed.

In an embodiment, when the software programs and/or the plurality of groups of instructions in the memory 1202 are run by the processor 1203, the transmitter device is further enabled to perform the following method step: ending the network preferential selection procedure if the transmitter device is currently connected to the Wi-Fi hotspot in the target frequency band.

In an embodiment, when the software programs and/or the plurality of groups of instructions in the memory 1202 are run by the processor 1203, the transmitter device is specifically enabled to perform the following method steps: receiving a first indication message from the receiver device; creating a personal hotspot in the target frequency band in response to the first indication information; and sending connection information of the personal hotspot to the receiver device, so that the receiver device is connected to the personal hotspot based on the connection information. In this way, when the receiver device does not meet the condition for connecting to the target hotspot, the transmitter device may create the personal hotspot in the target frequency band, so that the receiver device establishes the P2P connection on the personal hotspot created by the transmitter device.

In an embodiment, when the software programs and/or the plurality of groups of instructions in the memory 1202 are run by the processor 1203, the transmitter device is specifically enabled to perform the following method steps: receiving a remote network configuration request from the receiver device; configuring a P2P agent server network in the target frequency band in response to the remote network configuration request; and sending a configuration result of the P2P agent server network to the receiver device, so that the receiver device configures a local P2P agent client network based on the configuration result, to switch from the 2.4 GHz Wi-Fi network to the P2P agent server network. In this way, when the receiver device does not meet the condition for connecting to the target hotspot, the transmitter device may create the P2P agent server network in the target frequency band, so that the receiver device is connected to the P2P agent server network created by the transmitter device.

In an embodiment, the first broadcast message and the second broadcast message are Bluetooth low energy BLE broadcast messages, and the sending a P2P connection request to the receiver device includes: establishing a BLE connection with the receiver device; and sending the P2P connection request to the receiver device by using the BLE connection.

In an embodiment, when the software programs and/or the plurality of groups of instructions in the memory 1202 are run by the processor 1203, the transmitter device is further enabled to perform the following method step: before establishing the Wi-Fi P2P connection in the target frequency band with the receiver device, disconnecting the BLE connection from the receiver device.

An embodiment of this application further provides a computer storage medium. The computer-readable storage medium stores program instructions. When the program instructions are run on a computer, the computer is enabled to perform the methods in the foregoing aspects and the implementations of the aspects.

An embodiment of this application further provides a computer program product. When the computer program product is run on a computer, the computer is enabled to perform the methods in the foregoing aspects and the implementations of the foregoing aspects.

This application further provides a chip system. The chip system includes a processor, configured to support the foregoing apparatus or device in implementing functions in the foregoing aspects, for example, generating or processing information in the foregoing methods. In a possible design, the chip system further includes a memory, configured to store program instructions and data that are necessary for the foregoing apparatus or device. The chip system may include a chip, or may include a chip and another discrete device.

The objectives, technical solutions, and beneficial effects of the present invention are further described in detail in the foregoing specific implementations. It should be understood that the foregoing descriptions are merely specific implementations of the present invention, but are not intended to limit the protection scope of the present invention. Any modification, equivalent replacement, or improvement made based on the technical solutions of the present invention shall fall within the protection scope of the present invention.

What is claimed is:
1. A file sharing method, applied to a receiver device, wherein the method comprises:

receiving a first broadcast message sent by a transmitter device, wherein the first broadcast message comprises a file sharing request;

sending a second broadcast message to the transmitter device in response to the first broadcast message, wherein the second broadcast message comprises receiver device information;

receiving a P2P connection request of the transmitter device, wherein the P2P connection request is generated by the transmitter device based on the receiver device information;

when the receiver device is currently connected to a 2.4 GHz Wi-Fi network and does not support dual band dual concurrent (DBDC), starting a network preferential selection procedure in response to the P2P connection request, wherein the network preferential selection procedure is used for the receiver device to switch from the 2.4 GHz Wi-Fi network to a Wi-Fi network in a target frequency band, wherein the target frequency band comprises frequency bands of 5 GHz and above, wherein the network preferential selection procedure comprises determining whether the receiver device is currently connected to a Wi-Fi hotspot in the target frequency band, when the receiver device is not currently connected to the Wi-Fi hotspot in the target frequency band, selecting a target hotspot from surrounding Wi-Fi hotspots in the target frequency band based on a signal strength and/or a protocol standard of the Wi-Fi hotspot, when the target hotspot is selected, determining whether a condition for connecting to the target hotspot is met, and when the condition for connecting to the target hotspot is met, connecting to the target hotspot;

establishing a Wi-Fi P2P connection in the target frequency band with the transmitter device; and receiving a file sent by the transmitter device by using the Wi-Fi P2P connection.

2. The method according to claim 1, wherein the selecting the target hotspot from surrounding Wi-Fi hotspots in the target frequency band based on a signal strength and/or a protocol standard of the Wi-Fi hotspot comprises:

selecting, from the Wi-Fi hotspots in the target frequency band, a Wi-Fi hotspot that belongs to a same access point device as a Wi-Fi hotspot to which the receiver device is currently connected and that has a received signal strength indicator RSSI value greater than a first preset threshold as the target hotspot; and/or selecting, from the Wi-Fi hotspots in the target frequency band, a Wi-Fi hotspot that has a largest quantity of signal bars as the target hotspot; and/or selecting, from the Wi-Fi hotspots in the target frequency band, a Wi-Fi hotspot that has a highest protocol standard as the target hotspot.

3. The method according to claim 1, wherein the determining whether the condition for connecting to the target hotspot is met further comprises: determining, based on a score and/or a signal strength of the target hotspot, whether the condition for connecting to the target hotspot is met, wherein the score of the target hotspot is determined based on at least one or more of the following information: a quantity of times of success of historical connections between the receiver device and the target hotspot, a historical transmission rate, a historical signal strength, and a quantity of times of historical freeze.

4. The method according to claim 1, wherein meeting the condition for connecting to the target hotspot comprises any one of the following:

a score of the target hotspot is greater than or equal to a second preset threshold, and an RSSI value of the target hotspot is greater than or equal to a third preset threshold;

the score of the target hotspot is greater than a sum of a score of a Wi-Fi hotspot to which the receiver device is currently connected and a preset compensation value, and the RSSI value of the target hotspot is greater than or equal to a fourth preset threshold; or the target hotspot and the Wi-Fi hotspot to which the receiver device is currently connected belong to a same access point device, and designated bits in a media access control address MAC address are the same, and the RSSI value of the target hotspot is greater than or equal to a fifth preset threshold.

5. The method according to claim 1, further comprising:

ending the network preferential selection procedure when the receiver device is currently connected to the Wi-Fi hotspot in the target frequency band.

6. The method according to claim 1, further comprising:

when the target hotspot is not selected, or when the condition for connecting to the target hotspot is not met, starting a network multiplex procedure.

7. The method according to claim 6, wherein the network multiplex procedure comprises:

sending a first indication message to the transmitter device, wherein the first indication message is used to indicate the transmitter device to create a personal hotspot in the target frequency band;

receiving connection information of the personal hotspot from the transmitter device; and connecting to the personal hotspot based on the connection information.

8. The method according to claim 6, wherein the network multiplex procedure comprises:

sending a remote network configuration request to the transmitter device, wherein the remote network configuration request is used to indicate the transmitter device to configure a P2P agent server network in the target frequency band;

receiving a configuration result of the P2P agent server network from the transmitter device; and configuring a local P2P agent client network based on the configuration result, to switch from the 2.4 GHz Wi-Fi network to the P2P agent server network.

9. The method according to claim 1, wherein the first broadcast message and the second broadcast message are Bluetooth low energy (BLE) broadcast messages, and the P2P connection request is sent by the transmitter device by using a BLE connection; and before the receiving, by the receiver device, the P2P connection request from the transmitter device, the method further comprises: establishing the BLE connection with the transmitter device.

10. The method according to claim 1, wherein before the establishing the Wi-Fi P2P connection in the target frequency band with the transmitter device, the method further comprises: disconnecting a Bluetooth low energy (BLE) connection from the transmitter device.

11. A terminal device operating as a receiver device, comprising:

a processor;

a memory coupled to the processor and configured to store program instructions, wherein the processor is configured to execute the program instructions to cause the terminal device to:

receive a first broadcast message sent by a transmitter device, wherein the first broadcast message comprises a file sharing request;

send a second broadcast message to the transmitter device in response to the first broadcast message, wherein the second broadcast message comprises receiver device information;

receive a P2P connection request of the transmitter device, wherein the P2P connection request is generated by the transmitter device based on the receiver device information;

when the receiver device is currently connected to a 2.4 GHz Wi-Fi network and does not support dual band dual concurrent (DBDC), start a network preferential selection procedure in response to the P2P connection request, wherein the network preferential selection procedure is used for the receiver device to switch from the 2.4 GHz Wi-Fi network to a Wi-Fi network in a target frequency band, wherein the target frequency band comprises frequency bands of 5 GHz and above;

establish a Wi-Fi P2P connection in the target frequency band with the transmitter device;

receive a file sent by the transmitter device by using the Wi-Fi P2P connection;

when a target hotspot is not selected, or when a condition for connecting to the target hotspot is not met, start a network multiplex procedure, which when performed, is configured to:

send a first indication message to the transmitter device, wherein the first indication message is used to indicate the transmitter device to create a personal hotspot in the target frequency band;

receive connection information of the personal hotspot from the transmitter device; and connect to the personal hotspot based on the connection information.

12. The terminal device according to claim 11, wherein the network preferential selection procedure comprises to:

determine whether the receiver device is currently connected to a Wi-Fi hotspot in the target frequency band;

when the receiver device is not currently connected to the Wi-Fi hotspot in the target frequency band, select a target hotspot from surrounding Wi-Fi hotspots in the target frequency band based on a signal strength and/or a protocol standard of the Wi-Fi hotspot;

when the target hotspot is selected, determine whether a condition for connecting to the target hotspot is met; and when the condition for connecting to the target hotspot is met, connect to the target hotspot.

13. The terminal device according to claim 12, wherein to select the target hotspot from surrounding Wi-Fi hotspots in the target frequency band based on the signal strength and/or the protocol standard of the Wi-Fi hotspot comprises to:

select, from the Wi-Fi hotspots in the target frequency band, a Wi-Fi hotspot that belongs to a same access point device as a Wi-Fi hotspot to which the receiver device is currently connected and that has a received signal strength indicator RSSI value greater than a first preset threshold as the target hotspot; and/or select, from the Wi-Fi hotspots in the target frequency band, a Wi-Fi hotspot that has a largest quantity of signal bars as the target hotspot; and/or select, from the Wi-Fi hotspots in the target frequency band, a Wi-Fi hotspot that has a highest protocol standard as the target hotspot.

14. The terminal device according to claim 12, wherein to determine whether the condition for connecting to the target hotspot is met comprises to: determine, based on a score and/or a signal strength of the target hotspot, whether the condition for connecting to the target hotspot is met, wherein the score of the target hotspot is determined based on at least one or more of the following information: a quantity of times of success of historical connections between the receiver device and the target hotspot, a historical transmission rate, a historical signal strength, and a quantity of times of historical freeze.

15. The terminal device according to claim 12, wherein meeting the condition for connecting to the target hotspot comprises any one of the following:

a score of the target hotspot is greater than or equal to a second preset threshold, and an RSSI value of the target hotspot is greater than or equal to a third preset threshold;

the score of the target hotspot is greater than a sum of a score of a Wi-Fi hotspot to which the receiver device is currently connected and a preset compensation value, and the RSSI value of the target hotspot is greater than or equal to a fourth preset threshold; or the target hotspot and the Wi-Fi hotspot to which the receiver device is currently connected belong to a same access point device, and designated bits in a media access control address MAC address are the same, and the RSSI value of the target hotspot is greater than or equal to a fifth preset threshold.

16. The terminal device according to claim 12, the program instructions further cause the terminal device to:

end the network preferential selection procedure when the receiver device is currently connected to the Wi-Fi hotspot in the target frequency band.

17. The terminal device according to claim 12, the program instructions further cause the terminal device to:

when the target hotspot is not selected, or when the condition for connecting to the target hotspot is not met, start a network multiplex procedure.

18. The terminal device according to claim 17, wherein the network multiplex procedure comprises to:

send a first indication message to the transmitter device, wherein the first indication message is used to indicate the transmitter device to create a personal hotspot in the target frequency band;

receive connection information of the personal hotspot from the transmitter device; and connect to the personal hotspot based on the connection information.

19. A non-transitory computer storage medium, wherein the computer-readable storage medium stores program instructions, and when the program instructions are run on a computer operating as a receiver device, the computer is enabled to:

receive a first broadcast message sent by a transmitter device, wherein the first broadcast message comprises a file sharing request;

send a second broadcast message to the transmitter device in response to the first broadcast message, wherein the second broadcast message comprises receiver device information;

receive a P2P connection request of the transmitter device, wherein the P2P connection request is generated by the transmitter device based on the receiver device information;

when the receiver device is currently connected to a 2.4 GHz Wi-Fi network and does not support dual band dual concurrent (DBDC), start a network preferential selection procedure in response to the P2P connection request, wherein the network preferential selection procedure is used for the receiver device to switch from the 2.4 GHz Wi-Fi network to a Wi-Fi network in a target frequency band, wherein the target frequency band comprises frequency bands of 5 GHz and above;

establish a Wi-Fi P2P connection in the target frequency band with the transmitter device;

receive a file sent by the transmitter device by using the Wi-Fi P2P connection; and when a target hotspot is not selected, or when a condition for connecting to the target hotspot is not met, start a network multiplex procedure, which when performed, is configured to:

send a remote network configuration request to the transmitter device, wherein the remote network configuration request is used to indicate the transmitter device to configure a P2P agent server network in the target frequency band;

receive a configuration result of the P2P agent server network from the transmitter device; and configure a local P2P agent client network based on the configuration result, to switch from the 2.4 GHz Wi-Fi network to the P2P agent server network.

\* \* \* \* \*